(12) United States Patent
Rasmussen

(10) Patent No.: US 8,795,810 B2
(45) Date of Patent: Aug. 5, 2014

(54) LAMINATE OF THERMOPLASTIC FILM MATERIALS EXHIBITING THROUGHGOING POROSITY

(76) Inventor: Ole-Bendt Rasmussen, Walchwil (CH)

(*) Notice: Subject to any disclaimer, the term of this patent is extended or adjusted under 35 U.S.C. 154(b) by 1466 days.

(21) Appl. No.: 11/794,854

(22) PCT Filed: Jan. 5, 2006

(86) PCT No.: PCT/EP2006/000281
§ 371 (c)(1),
(2), (4) Date: Apr. 24, 2009

(87) PCT Pub. No.: WO2006/072604
PCT Pub. Date: Jul. 13, 2006

(65) Prior Publication Data
US 2012/0040134 A1 Feb. 16, 2012

(30) Foreign Application Priority Data

Jan. 7, 2005 (GB) .................................. 0500271.2
May 11, 2005 (GB) .................................. 0509615.1
Jun. 3, 2005 (GB) .................................. 0511394.9

(51) Int. Cl.
*B32B 3/10* (2006.01)
*B32B 3/30* (2006.01)
*B32B 38/04* (2006.01)
*B29C 55/18* (2006.01)
*B32B 3/26* (2006.01)
*B32B 38/18* (2006.01)

(52) U.S. Cl.
CPC ............... *B29C 55/18* (2013.01); *B32B 3/266* (2013.01); *B32B 38/1825* (2013.01); *B32B 38/04* (2013.01); *B32B 2307/7265* (2013.01); *B32B 2307/724* (2013.01)
USPC .......................... 428/137; 428/220; 264/292

(58) Field of Classification Search
CPC ............... B32B 3/266; B32B 38/1825; B32B 2307/7265; B32B 2307/724; B29C 55/18
USPC .................................... 428/137, 220; 264/292
See application file for complete search history.

(56) References Cited

U.S. PATENT DOCUMENTS 2,406,815 A * 9/1946 Thore ........................... 428/185
2,593,328 A * 4/1952 Meaker ......................... 383/101

(Continued)

FOREIGN PATENT DOCUMENTS

DE 10116477 A1 10/2002
WO WO02102592 A 12/2002
WO WO 02102592 A1 * 12/2002

OTHER PUBLICATIONS

PCT International Search Report.

*Primary Examiner* — William P Watkins, III
(74) *Attorney, Agent, or Firm* — Robert W Strozier

(57) ABSTRACT

A laminate of thermoplastic film materials exhibiting throughgoing porosity and comprising plies A and B, A having an inner surface A1 partly in contact with B and an outer surface A2, and B having an inner surface B1 partly in contact with A and an outer surface B2, A and B consisting of continuous material except for a multitude of perforations in each ply, whereby essentially no perforation in A corresponds directly to a perforation in B, the lamination between A and B on surfaces A1 and B1 being a) through a coextruded lower melting lamination layer on A and/or B and b) established in such discontinuous manner that there is formed a channel system between A1 and B1 connecting the majority of the perforations in A each with at least one of the perforations in B, and connecting the majority of the perforations in B each with at least one of the perforations in A is provided in addition to a process and apparatus for producing such a laminate.

70 Claims, 16 Drawing Sheets

(56) References Cited

U.S. PATENT DOCUMENTS

| | | | | |
|---|---|---|---|---|
| 3,628,720 A | * | 12/1971 | Schmedding | 383/101 |
| 3,701,536 A | * | 10/1972 | Matthews et al. | 277/415 |
| 3,954,933 A | | 5/1976 | Rasmussen | |
| 4,039,364 A | | 8/1977 | Rasmussen | |
| 4,084,028 A | | 4/1978 | Rasmussen | |
| 4,115,502 A | | 9/1978 | Rasmussen | |
| 4,125,581 A | | 11/1978 | Rasmussen | |
| 4,143,195 A | | 3/1979 | Rasmussen | |
| 4,207,045 A | | 6/1980 | Rasmussen | |
| 4,229,394 A | | 10/1980 | Rasmussen | |
| 4,293,294 A | | 10/1981 | Rasmussen | |
| 4,294,638 A | | 10/1981 | Rasmussen | |
| 4,368,017 A | | 1/1983 | Rasmussen | |
| 4,377,544 A | | 3/1983 | Rasmussen | |
| 4,403,934 A | | 9/1983 | Rasmussen | |
| 4,407,877 A | | 10/1983 | Rasmussen | |
| 4,420,451 A | | 12/1983 | Rasmussen | |
| 4,421,810 A | | 12/1983 | Rasmussen | |
| 4,422,837 A | | 12/1983 | Rasmussen | |
| 4,430,284 A | | 2/1984 | Rasmussen | |
| 4,436,568 A | | 3/1984 | Rasmussen | |
| 4,440,709 A | | 4/1984 | Rasmussen | |
| 4,465,724 A | | 8/1984 | Rasmussen | |
| 4,492,549 A | | 1/1985 | Rasmussen | |
| 4,550,546 A | * | 11/1985 | Raley et al. | 53/425 |
| 4,629,525 A | | 12/1986 | Rasmussen | |
| 4,636,417 A | | 1/1987 | Rasmussen | |
| 4,767,488 A | | 8/1988 | Rasmussen | |
| 4,793,885 A | | 12/1988 | Rasmussen | |
| 4,874,653 A | | 10/1989 | Rasmussen | |
| 4,908,253 A | | 3/1990 | Rasmussen | |
| 5,028,289 A | | 7/1991 | Rasmussen | |
| 5,205,650 A | | 4/1993 | Rasmussen | |
| 5,248,366 A | | 9/1993 | Rasmussen | |
| 5,330,133 A | | 7/1994 | Rasmussen | |
| 5,361,469 A | | 11/1994 | Rasmussen | |
| 5,626,944 A | | 5/1997 | Rasmussen | |
| 6,344,258 B1 | | 2/2002 | Rasmussen | |
| 6,787,206 B2 | | 9/2004 | Rasmussen | |
| 6,887,503 B1 | | 5/2005 | Rasmussen | |
| 7,001,547 B2 | | 2/2006 | Rasmussen | |
| 7,132,151 B2 | | 11/2006 | Rasmussen | |
| 2003/0165663 A1 | * | 9/2003 | Christopherson et al. | 428/137 |
| 2004/0070105 A1 | | 4/2004 | Rasmussen | |
| 2004/0247730 A1 | | 12/2004 | Rasmussen | |
| 2005/0095411 A1 | | 5/2005 | Rasmussen | |
| 2005/0118304 A1 | | 6/2005 | Rasmussen | |
| 2007/0082188 A1 | | 4/2007 | Rasmussen | |
| 2007/0254120 A1 | | 11/2007 | Rasmussen | |
| 2007/0257402 A1 | | 11/2007 | Rasmussen | |
| 2007/0290416 A1 | | 12/2007 | Rasmussen | |
| 2008/0035714 A1 | | 2/2008 | Rasmussen | |
| 2009/0206510 A1 | | 8/2009 | Rasmussen | |
| 2009/0233041 A1 | | 9/2009 | Rasmussen | |

* cited by examiner

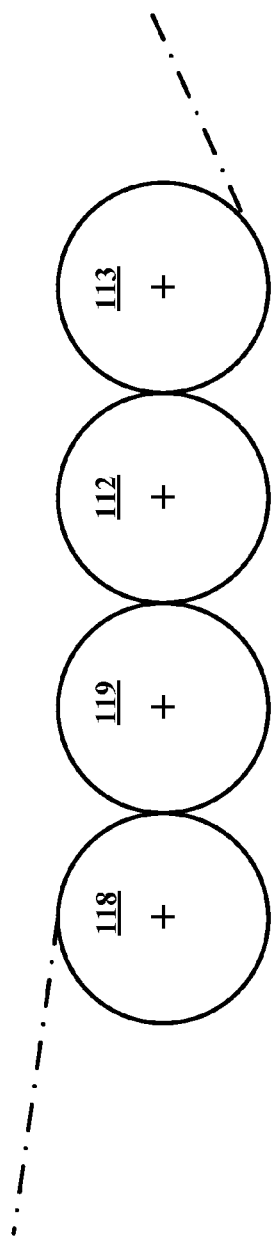

LAMINATE OF THERMOPLASTIC FILM MATERIALS EXHIBITING THROUGHGOING POROSITY

RELATED APPLICATIONS

This application is a nationalization of PCT/EP2006/000281 filed 5 Jan. 2006 (05.01.2006) and published as WO 2006/072604 A2 claiming priority to United Kingdom Patent Application Serial Nos. GB0500271.2 filed 7 Jan. 2005 (07.01.2005), GB0509615.1 filed 11 May 2005 (11.05.2005) and GB0511394.9 filed 3 Jun. 2005 (03.06.2005).

BACKGROUND OF THE INVENTION

1. Field of the Invention

The invention concerns a laminate of thermoplastic film materials which exhibits throughgoing porosity, in more detail a porosity which at least over a part of the passage of a fluid from one surface to the other has the character of microporosity. Microporous film or sheet materials, including laminates, find extensive use, in particular as "house wrap film", roof underlay and apparel which protects against rain, while allowing moisture to dissipate.

For such applications the resistance to hydrostatic and dynamic water pressure combined with easy passage of air and water vapor, as well as yield tension, puncture strength and tear propagation resistance are particularly important. For use as roof underlay it is generally considered that the resistance to hydrostatic water pressure must be at least about 60 cm preferably as much as 100-200 cm, water, while the requirement for simpler "house wrap film" is lower. Present materials used for the higher quality markets comprise fibrous sheets formed by flash-spinning (Tyvek®) and laminates of fabrics and microporous film. The manufacturing costs for these products are rather high. For simpler "house wrap film" cheaper materials are used e.g. laminates of a meltblown fibrous web and non-woven fabrics or reinforced films with perforations in the range about 50-100 µm.

It can be expected that the market for film or sheet material with throughgoing porosity but relatively high resistance to hydrostatic pressure and good strength properties can be extended to other groups of commodity articles e.g., to "breathable" industrial bags, if the manufacturing costs are reduced.

2. Description of the Related Art

The term "bosses" as used hereinafter refers to a distinctly protruding portion of the surface of a polymer film, the smallest dimension of which, measured on the film surface is at the most a few millimeters. The distance between such protruding surface portions is at the most, a few millimeters. The protrusion must be distinct but need only amount to a fraction of the film thickness.

The general concept of forming a throughgoing porosity in a film laminate under use of an interfacial channel system, which connects mutually displaced series of perforations in the plies, is known from the applicant's earlier invention, published in WO-A-04/54793, see especially FIG. 13. However, in the disclosure in this patent application, there are no constrained, interfacial channel parts as in the present application, the interfacial channels being formed by flutes alone. As a consequence the resistance to hydrostatic pressure is very low, while the resistance to dynamic water pressure (to rain storm) is high and the possibilities for ventilation through the laminate are particular good. As it appears from the said publication, some constrain can be introduced by addition of a fibrous layer between the fluted plies, which however is not as simple and not as efficient as the establishment of the above mentioned barrier parts of the interfacial channel system. While according to the invention the gap must be limited to generally about 200 micrometers or less, it is usually preferable that it be no more than generally about 100 micrometers, and when a resistance against 100 cm hydrostatic pressure is required, a gap of about 50 micro-meters or less may be needed. The gap may even be as narrow as a few micrometers, but formed distinctly as will be described later.

However, generally the average gap should be no less than 3 µm, preferably no less than 5 µm, over a majority of the area which forms the barrier part. For most purposes such as roof underlay, "house-wrap-film", waterproof apparel, sanitary products, breathable bags and other potential uses, in which good ventilation or vapor transmission is requested, the said average gap should preferably be no less than 10 µm.

Spot- or linebonded laminates, in which the piles are perforated with the perforations in different piles mutually displaced, are also known from other patent publications, as follows.

GB-A-1075891 (Kaaber) concerns a laminate for packing purposes, consisting of two or several layers of a polymer sheet or film, provided with holes for allowing passage of gases and vapor, in which the holes in at least one of the layers are covered by non-perforated material of another layer, the lamination being only partial so as to leave a passage from each hole in one layer to at least one hole in the adjoining layer. Preferably the individual layers consist of substantially unidirectionally orientated films made from highly crystalline polymers, the direction of orientation varying in adjoining layers in the laminate. In this patent, there is not taken any precaution to secure or control the passage of gases or vapor between two adjacent piles from holes in one ply to holes in the other ply, and such passage will depend on accidentally occurring surface irregularities or small lamination irregularities.

DE-A-3245195 concerns a method of manufacturing webs of material coated with a plastic film, especially coated paper or coated non-wovens. The webs are supplied with microperforations, preferably by means of electrical sparks. The field of uses are in particular sanitary items. In an embodiment there is used two such coated and microperforated webs, and the microperforations in the two webs are mutually displaced. It is disclosed that there can be distance between the two webs with the purpose to set-up a further resistance to the passage of fluid, but there is no teaching of how this distance is achieved, neither is anything mentioned regarding the bonding system.

U.S. Pat. No. 4,567,080 (Korsgaard) concerns a vapor barrier comprising two vapor-tight layers. The openings in one layer are arranged in displaced positions relative to the openings in the other layer. The vapor barrier offers a resistance to the diffusion of water vapor through the vapor barrier from one side towards the other, and enables condensed water formed on the other side of the vapor barrier to travel in the opposite direction and to be evaporated from the first mentioned side. This product is mainly thought of as a vapor barrier for use in connection with roof construction comprising a vapor-tight outer covering. The holes have relatively large dimensions, e.g. (if they are circular) the diameter in the layer which is placed interiorly can be 20-30 mm, while the diameter of the other (exterior) layer can be about 5. Due to the water absorbing layer between the two layers of vapor-tight material it is clear that this product construction does not exhibit any resistance to hydrostatic water pressure, a property which the market today requests.

US-A1-2003/0165663 concerns a gas permeable polymeric film laminate comprising two perforated polymeric films bonded together such that there are gas passage between the films from perforations in one film to perforations in the other film, the perforations having a minimum dimension of at least 20 μm and the passages having a maximum dimension of not more than 15 μm. Such films laminates are proposed for use in form of packages for medical equipment, with the affect that they act as bacteria filters, while allowing sterilant gas to go through the film. The only method which is disclosed for the establishment of the low distance between the two films is by laminating the latter under use of an appropriate adhesive applied in a suitable pattern which allows the flow of gas from holes in the other film, and hereby the distance between the two films is determined by the thickness of the adhesive. However, it is difficult to adjust this thickness under industrial conditions especially when making wide webs, since it requires precision in the construction of the laminating rollers, to squeeze the applied adhesive evenly and with correct thickness over the full length of the rollers.

SUMMARY OF THE INVENTION

The present invention aims at such reduction of manufacturing cost without sacrificing the resistance against hydrostatic pressure, and in an important embodiment also aims at high strength properties in connection herewith.

The invention is based on the concept that a part of the way which a fluid must pass to reach from one external surface of a laminate to its other external surface is a constrained channel system formed in simple manner between the laminated surfaces, which therefore are only spotbonded or linebonded. The passage from one external surface of the laminate to this interfacial system takes place through one series of perforations made in one of the laminate plies, while the passage from the interfacial channel system to the other external surface of the laminate takes place through another series of perforations in the other ply, whereby the two series of perforations are mutually displaced.

The product according to the invention is a laminate of thermoplastic film materials exhibiting throughgoing porosity and comprising plies A and B, A having an inner surface A1 partly in contact with B and an outer surface A2, and B having an inner surface B1 partly in contact with A and an outer surface B2, A and B consisting of continuous material except for a multitude of perforations in each ply, whereby essentially no perforation in A is directly aligned with a perforation in B, the lamination between A and B on surfaces A1 and B1 being a) through a coextruded lower melting lamination layer on A and/or B and b) established in such discontinuous manner that there is formed a channel system between A1 and B1 connecting the majority of the perforations in A each with at least one of the perforations in B, and connecting the majority of the perforations in B each with at least one of the perforations in A, characterized in that through at least a barrier part of each such connection the gap is limited to generally about 200 μm or less measured from surface A1 to surface B1 the gap being formed by surface irregularities in surface A1 and/or B1 whereby the surface comprises protruding bosses and receding portions.

As it appears herefrom the interfacial system i.e the connection of A1 to B1, system needs not to be constrained all over, the need is only that at least a part (in the claims called the barrier part) of the channel connection between a perforation in A and a perforation in B is confined to a gap of generally about 200 micrometers or less. For clearer understanding of this, reference is made to FIGS. 13a and 13b in which a substantial part of the interfacial passage takes place through flutes which are much less constrained.

The present invention further relates to a process for forming a laminate of thermoplastic films exhibiting throughgoing porosity, in which ply A having a surface A1 is brought into contact with ply B having a surface B1, with AI in contact with B1, and A is laminated to B by a lamination process in which a coextruded lower melting lamination layer on A and/or B is heated and at least partially melted while A1 and B1 are in contact and in the process A and B are each provided with perforations and A and B are in register with one another in such a manner that essentially no perforations in A correspond to a perforation in B and the lamination between A and B is established in a discontinuous manner such that a channel system is formed between A1 and B1 connecting the majority of the perforations in A each with at least one of the perforations in B via channels and such that a majority of the perforations in B is connected with at least one of the perforations in A via channels, characterized in the extrusion process or subsequent derformation processes A1 and/or B1 is provided with surface irregularities forming protruding bosses and adjacent receding portions whereby at least in a banner part of the laminate the gap between A1 and B1 is limited generally to about 200 μm or less and the lamination being carried out by heat and pressure to at least partially melt the lamination layer or layers.

In the foregoing, the invention has been described with particular view to materials which can withstand hydrostatic pressure and dynamic water pressure, but allow passage of vapor and air. For this purpose, surface A1 and B1 are preferably hydrophobic at least throughout the barrier part. Care must be taken that the raw materials do not contain any additive which may ruin the hydrophobic properties if it migrates.

Thus an embodiment of the product according to the invention is characterized in that the surface A1 and B1 consist of polyethylene at least where they form the barrier part of the connections. For price reasons it is in fact preferable that the laminate mainly consists of polyethylene (HDPE, LDPE or LLDPE including metallocene or polymerized PE materials or polypropylene). The hydrophobic character can be enhanced by admixing silicone rubber or silicone oil, the latter in very small amounts into the surface layer, which in that case preferably consists of a thin co-extruded layer. However, the laminate according to the invention can also be applied for certain filtration purposes in which water must be allowed to pass with relative ease, and in such cases the constrained channel system should of course not be hydrophobic.

BRIEF DESCRIPTION OF THE DRAWINGS

Further details of the invention will appear from the accompanying drawings, of which FIG. 1, which shows a section through a laminate according to the invention, represents an embodiment in which the surface irregularities which establish the interfacial capillary passageways consist of spotformed bosses in ply A, and both plies A and B in themselves are cross laminates;

FIG. 2a in principle shows the line, and FIG. 2b is an axial section through the surface parts of the male and female rollers in the position where the embossment takes place.

FIGS. 8a and 8b represent a modification of the apparatus shown in FIG. 5. In this modification here are two pairs of grooved rollers working in "registration" as indicated by broken lines, whereby the pattern of embossment can be finer, however the measures indicated are examples only. FIG. 8a shows the roller arrangement and FIG. 8b the operation of the cogs.

FIG. 9a is a section perpendicular to the axis of the rollers, and FIG. 9b shows, enlarged compared to FIG. 9a, the section x-x in FIG. 9a.

FIG. 14a is a section perpendicular to the flutes which may extend longitudinally or transversely or under an angle to both of these directions, while FIG. 14b shows a different section, indicated as y-y in FIG. 14a.

DETAILED DESCRIPTION OF THE INVENTION

Figure 1:
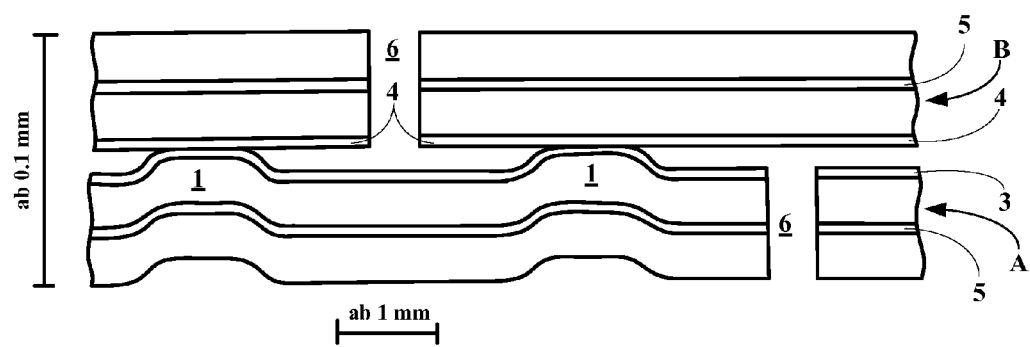

As mentioned in the introduction, certain categories of strength properties are also highly important. For house wrap film and roof underlay, tear propagation strength is particularly important, since such film or sheet usually is mounted with nails. As well known, high tear propagation resistance under slow or fast tearing can be achieved by crosslamination technology. Accordingly, an important embodiment of the invention is characterized in that A and/or B in themselves are crosslaminates, or both consist of oriented material each with a main direction of orientation, the two main directions of orientation crossing each other. It is hereby noted that normal microporosity in a film (not including flash-spun fibrous webs) weakens the film considerably, especially with respect to tear propagation resistance. In contrast to this, the "interfacial" channel system, when adequately applied, does not cause any weakening, and in case A and B exhibit main directions of orientation which criss-cross, the spot- or linebonding, which is a feature of this system, will even tend to improve the tear propagation strength by the effect of a local delamination, which reduces the notch effect during tearing. The perforations in A and B will cause some, but relatively small, reduction of tensile strength.

In general, cross lamination technology combined with particular development of the orientation, gives wide possibilities to select adequate balance between the different strength properties. WO-A-03/033241 and WO-A-04/094129 deal with improved strength especially at elevated temperatures. This is e.g. important for cement bags, which normally are filled at temperatures around 80° C. or higher. "Breathability" is also important for cement bags. In general, the present invention can with advantage be carried out in conjunction with inventions disclosed in the said two international applications.

In the above description of cross lamination, the expression "main direction of orientation" has been used. This may require explanation. If a ply is uniaxially oriented, or is biaxially oriented with one direction dominating, this is the "main direction of orientation"

However, each of the plies A and B may consist of two or more films which exhibit main directions of orientation. In this case the main direction of orientation in ply A or in ply B is the resultant main direction, which eg. can be determined by shrinkage tests at elevated temperatures after separation of ply A from ply B. Normally the separation can easily be done by simple peeling, since as mentioned a strong bonding generally is unsuitable in the manufacture of cross-laminates, causing low tear propagation resistance. The shrinkage tests can conveniently be carried out in hot air or hot glycerol.

The surface irregularities and the spot- or linebonding, which together form the barrier part of the "interfacial" channel system can be established by different means. In one system the surface irregularities in the barrier part are formed by bosses created by impression in ply A and/or ply B. The lamination which consists in spotbonding or linebonding may be independent of these bosses, but spotbonding may also be established on the bosses and may extend to all the bosses or be confined to some of the bosses on A and/or B.

In another system the surface irregularities are formed by addition of a particulate material such as diatomeric earth to A and/or B. This addition is preferably limited to a coextruded surface layer which forms surface A1 and/or B1. Related to this is a system in which the surface irregularities are formed by meltfracture in the surface A1 and/or the surface B1.

Alternatively or supplementally the surface irregulations can be in the form of randomly occurring stretching irregularities, in particular of the type occurring in stiff polymer such as high density polyethylene or polypropylene at low stretching ratios and low stretching temperatures. This precaution is in particular suitable as a supplement to the surface irregularities produced by addition of material or by melt fracture.

In all these cases (i.e. in the particulate addition, the melt fracture and the stretching irregularity embodiments) the spot- or linebonding must usually be established independent of the surface irregularities. Meltfracture can, as well known, easily be promoted in a layer of LLDPE, which is very prone to meltfracture if the shear velocity is high and the extrusion temperature low. Meltfracture is otherwise considered a serious fault, but is in this embodiment of the invention beneficially utilized.

In still another system the surface irregularities are constituted by overstretched, narrow linearly extending thinner regions of A and/or B. They create narrow, linearly extending thicker protruding regions on surface A1 and/or B1. This is further explained in connection with the drawings and the examples.

Also in this case, spotbonding may alternatively be established independent of or on and confined to all or some of the bosses on A and/or B.

In a particularly suitable system of establishing spotbonding independent of protruding surface portions there is a lamination layer on both A and B, and both lamination layers are limited to a pattern consisting of an array of strips. The strips on A cross the strips on B to form bonding only at the spots where the strips of the two arrays intersect.

A special embodiment of the invention combines the advantages of the present invention and of a laminate comprising a fluted ply and a flat ply, as the latter in particular is disclosed and explained in WO-A-02/102592. The construction of this laminate is characterized in that ply A is fluted with flutes defining channels which extend linearly in the longitudinal or transverse direction, with the basis of the flutes bonded to a generally flat ply B, whereby the flutes define channels which extend generally in the longitudinal or transverse direction of the laminate, the wavelength of the flutes preferably being about 3 mm or less and the height of the flutes preferably being about. 0.3 mm or more, whereby the barrier parts of the channel formed connections are at the basis of the flutes where ply A is bonded to ply B, and are formed by segmentally stretched, narrow, thinner regions in B which extend under an angle to the direction of the flutes and is further described in connection with FIGS. 13a and 13b.

The intermediary product from the production of this porous laminate, i.e. the product which still has not been perforated, is considered an invention in itself and is useful for several purposes, since the flutes in ply A provides it with stiffness in one direction, and the narrow linearly extending segmentally stretched thinner regions of ply B provides it with improved tear propagation resistance, at the same time as the flutes as well as the pattern of thinner regions provide a textile-like aesthetic effect.

A special use of this embodiment including the perforations concerns a laminate, which is able to absorb water formed by condensation on one of its sides, and release this water as vapor on the other side. This product is characterized in that the channels formed by the narrow, thinner regions are hydrophobic as achieved by the choice of polymer materials, while at least a part of the channels formed by the flutes are hydrophilic either due to contents of a hydrophilic filling material in these channels or a hydrophilic coat on the part of surface A1 that forms walls of these channels. The hydrophilic filling material may e.g. be in a form of yarn or fine hydrophilic granules. The application of filling material to the flutes is described in the above mentioned publication WO 02/102592.

In every embodiment of the invention there is a multitude of perforations in each ply A and B, which perforations are mutually displaced, thereby forcing a throughgoing fluid to pass the interfacial channel system. The perforations need normally not be particular fine, and can be made prior to the lamination by a set of ordinary pin rollers, operating in correct registration. However, in the case where ply A is fluted, the perforations in this ply are best made subsequent to the lamination by means of a roller with hot protruding knives or needles, as further described in WO-A-04/54793.

A preferable embodiment of the invention is characterized in that in the ply or plies with surfaces irregularities formed by segmentally stretched, linear, thinner regions, (receding portions) the protruding bosses are preferably uniaxially orientated essentially in their longitudinal direction, and the formation of the receding portions has been established by segmental stretching transverse to this direction.

Furthermore the bonding is confined to all or some, preferably the majority of the thicker linear regions. This provides a particularly well-controlled and stable interfacial porosity. The embodiment is illustrated by the microphoto FIG. 7. Preferably the division between such linear thinner regions is no larger than about 0.3 to 0.4 mm, and more preferably no larger than about 0.2 mm. The width of the thinner regions should preferably be generally between about 0.05-0.2 mm. Both plies A and B may have interfacial surface irregularities formed by such embossment, in which case the two linear patterns should criss-cross each other. To achieve this, one ply may be embossed and stretched in the longitudinal direction of a coextruded web (coextruded in order to obtain a suitable bonding layer) while the other ply may be embossed and stretched in the transverse direction. The embossment is preferably carried out by segmental stretching transverse to the direction in which the bosses shall extend, in the former case preferably by means of intermeshing grooved rollers with circular or helical grooves, and in the last mentioned case preferably by means of intermeshing cog-rollers which have the cogs extending generally in the axial direction.

Alternatively both plies A and B may be prepared from a tubular coextruded film, which in lay-flat form is embossed and orientated in its longitudinal direction and subsequently helically out to form a web with orientation and embossed pattern on bias.

Two such webs can then be laminated with their orientations and embossed patterns crossing each other. In all cases the (generally uniaxial) orientation may precede the embossment, or the embossment may precede the orientation. The last mentioned succession is preferable, and during the orientation the film should preferably be allowed to follow its tendency to contract perpendicularly to the direction in which it is stretched, since this will enhance the strength properties and will make the pattern of embossment finer. When the laminate of the invention (preferably a crosslaminate) has spot or lineformed bosses at its interface and the bonding between A and B is confined to all or some of these bosses, the distance between adjacent bosses engaged in the bonding should be no longer than generally about 1 mm, in order to achieve a sufficient stability of the size of the interfacial capillaries it will often be necessary to get this distance down to about 0.1-0.2 mm or even lower.

When a tubular film in a lay-flat form is segmentally stretched between intermeshing grooved rollers with circular cogs to make an array of longitudinally extending bosses and receding film portions, a few mm of the material adjacent to the edges of the lay-flat tube will inherently move in a direction towards the middle of the film, such that segmental stretching immediately adjacent to the edges is avoided. After spiral cutting and lamination this shows as biased lines which look different from the rest of the laminate and give an unaesthetic effect. In order to cover this and convert the unaesthetic effect to an aesthetically pleasing effect, an embodiment of the invention is characterized in that the segmental stretching is carried out with grooved rollers on which there are intervals of missing cogs, to obtain a stretching result in which there occurs a regular pattern of parallel linear regions, which are without receding portions and have a width at least 10 times the average width of the receding portions.

A further improvement in connection with the segmental stretching of tubular film between grooved rollers, subsequent helical cutting, perforating and crosslamination is characterized in a process that the perforations in the two plies A and B formed in a regular pattern, and the directions of the criss crossing arrays of receding portions are coordinated with this pattern in such way that essentially no single thin portion in B leads from any perforation in A to any perforation in B.

Furthermore in this connection it is an advantage that a fluid under pressure, preferably air, is passed through the laminate from the ply A side to the ply B side to bend the receding portions in both plies in the direction of this flow, whereby preferably the fluid has an elevated temperature suitable for stabilization of the bent shape of the receding portions. These precautions are explained in connection with FIGS. 11 and 12.

The invention also contemplated the creation of capillaries having depth and width in the 1-10 µm region. This is not useful for house-wrap-film, but e.g. for bacteria filters, such as packaging film which holds back bacteria and allows sterilizing gas to pass into the packages. With such a use in mind an embodiment of the invention provides the surface irregularities on one or both of the plies A and or B as impressions in the form of a pattern or parallel, fine, linear furrows. Preferably the ply or plies with such furrows is orientated in generally uniaxial manner generally parallel with these furrows. Preferably both plies A and B have such patterns of impressions on the surfaces which are bonded together, and the two patterns criss-cross each other.

The furrows of such fine dimensions can be created by rolling, using a hard roller which has a laser-engraved pattern, and which works under a high roller pressure against a semi-hard rubber roller. The rolling process should preferably take place at an elevated temperature, but with all layers in the ply in solid state. Details are the parameters of this rolling process may be critical, but can easily be established by a person with skills in embossment of plastic films.

Similar is true for the lamination process in the embodiments of the invention in which the surface irregularities are formed by meltfracture or by addition of a particulate material to the lamination layer of A and/or B. In these embodiments the roller pressure and the character of the roller surfaces which form the nip in the lamination process, is of a high importance. If the pressure is too low or both roller surfaces too hard, there may be larger areas which do not bond at all. If the pressure is too high or one or the roller surfaces too soft, the two plies may bond to each other to such an extent that there will not be formed interfacial passageways. However, it is not difficult for a person with skills in plastic film lamination to establish suitable parameters for such lamination.

In order to obtain well-controlled and exact displacement between the perforation in ply A and ply B, the two plies are preferably perforated together with the lamination layer on A facing the lamination layer on B. This common perforation is carried out after the creation of surface irregularities, after the orientation, and after spiral cutting of tube if this process is applied. In line with the perforation the plies are separated but move parallel together towards the heat/pressure lamination unit, and during this passage ply B is moved slightly longer or slightly shorter than ply A, the difference being adjusted to obtain the desired displacement between the two plies. This is a very precise method of establishing displaced perforation in laminated films. Alternatively or supplementally the plies may be mutually displaced in the lateral direction.

The common perforation can be carried out by means of needle rollers or by a reciprocating movement of one or more rows of needles. The size of the holes formed by the perforations should generally be about 0.1-0.6 mm in each of the flat dimensions, preferably generally about 0.2-0.3 mm, and the distance between neighboring holes in one and the same ply should generally be about 0.5-4 mm, preferably about 0.5-1.5 mm. The location of the perforations will normally be at random, seen in relation to the interfacial channel system.

The perforation can take place hot, i.e. under local melting of the plies, or cold. Hot perforation has the advantage that the perforations will be surrounded by material which is generally unorientated and thicker than the immediately adjacent material. This gives a tear-resistant effect and enhances most strength properties of the laminate. Hot perforation can be carried out by means of hot needles or by means of hot serrated blades, as further disclosed in connection with FIGS. 9a and 9b. If hot perforation is chosen and the plies are perforated together, the separation of the plies after perforation, which is needed in order to allow the mutual displacement of the holes, must take place before the molten material solidifies. When cold-perforation is used, and when the holes are of the mentioned relatively large size, there will normally be formed a small flap adjacent to each hole in each ply. These flaps can be laid down to one side by passage over a frictional surface so as to keep the hole clean, or may be "shaved" off by passage over one or more sharp blades. The latter may be stationery, may vibrate or may be endless moving blades. In fact the preceding process which uses needle rollers or similar, needs not really perforate the plies, it is enough that they form deeply protruding thinner "bosses", which then can be cut off by the blades to create the holes.

The needles or similar devices used for the protruding may be formed as suitably shaped serrations on blades to form a "needle roller", several such blades may be assembled in close proximity to each other on the surface of a roller. Alternatively one or more such blades may be assembled on a reciprocating device. This is a simple method of arranging the "needles" close to each other and renewing them when they are worn out.

In the foregoing, only the two plies A and B have been explicitly described, but it must be understood that there can be further plies forming analogous channel connections, the laminate according to any of the preceding claims, characterized in that a further ply C is added on surface A2, said ply C similarly being supplied with a big multitude of perforations which are offset relative to the perforations in A and that similarly connecting channels between the two series of perforations are formed at the interphase, each such connection comprising a barrier part. The laminate can further be characterized in that a further ply D is added on surface B2, said ply D similarly being supplied with a big multitude of perforations which are offset relative to the perforations in B and that similarly connecting channels between the two series of perforations are formed at the interphase, each such connection comprising a barrier part.

Thus a further ply C can be added on surface A2, which ply C similarly is supplied with a multitude of perforations. The latter are offset relative to the perforation in A, and there are in similar manner connecting channels formed between the two series of perforations. Each such connection comprises a barrier part. In another embodiment a further ply D is added on surface D2, which ply D similarly is supplied with a multitude of perforations offset relative to the perforations in B, and there are in manner connecting channels formed between the two series or perforations at the interphase. Each such connection comprises a barrier part.

However, it can also be an essential advantage to add on one or both sides of the laminate a film, which is perforated with perforations coinciding with the perforations in the adjacent film. Such added film will act to reinforce the laminate and should preferably be orientated. In any case the bonding between each layer in the laminate according to the invention should preferably take place under use of coextruded lamination layers with melting range lower than the rest of the laminate.

The invention concerns not only the product, but also the method and apparatus for making it.

FIG. 1a illustrates one embodiment of the invention, in which the interfacial channel system is produced by embossment of one crosslaminated ply A and spotlamination of this ply with crosslaminated ply B. The spotlamination is limited to the bosses (1). The drawings show a longitudinal or transverse section of the laminate (it can be either). Note that the scale of the thickness dimension is much bigger than the scale of the other dimension. The lamination has been established through lower melting surface layers (3) and (4) of each ply. The latter are uniaxially oriented and crisscross, A and B are both crosslaminates. The films have been laminated under use of meltextrusion through meltextruded layer (5). Prior to the lamination of A and B there was made perforations through each of the plies A and B. Those in A are displaced from those in B. Perforations (6) lying in the view section are fully drawn, while perforations outside the view plane (7) are shown with interrupted lines (see FIG. 2).

Figure 2A:
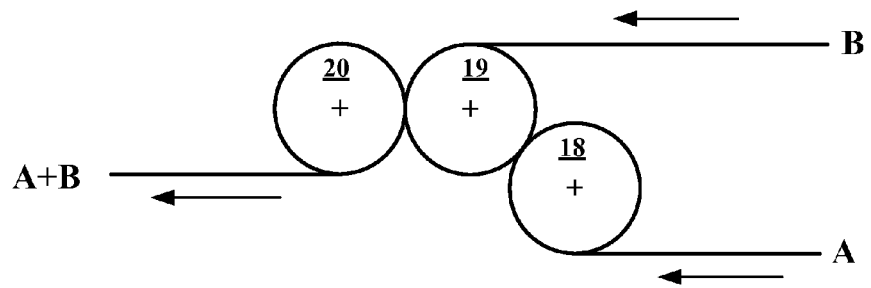
FIGS. 2a and 2b illustrate the apparatus for making the product of FIG. 1.
Figure 2B:
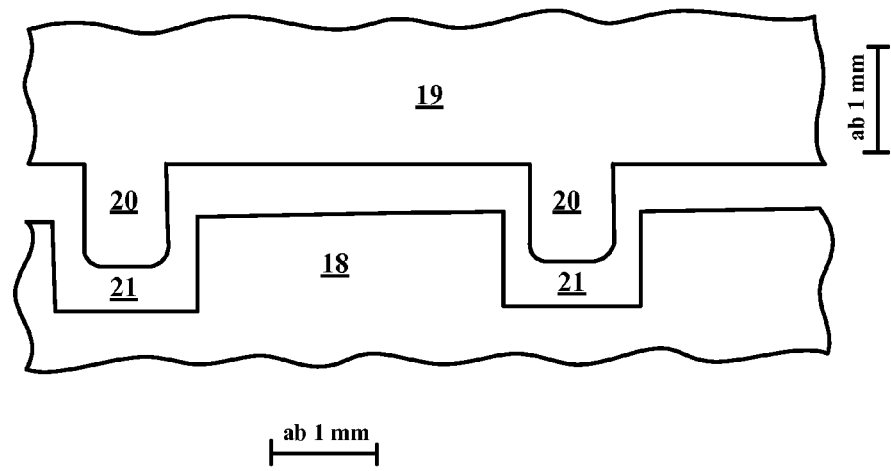

With reference to FIGS. 2a and 2b, this structure can be produced as follows: Upstream of the driven rollers (18) and (19) plies A and B are perforated by driven pinrollers (not shown) which are synchronized with rollers (18) and (19). The surface of roller (19) is supplied with protruding knobs (20) and roller (18) with corresponding holes (21). Roller (19) is heated at least to the melting point of the lamination layers, but considerably below the melting point of the main layer. Hereby ply A is embossed. Together with ply B it is transferred to the nip between roller (19) and its counterroller (20). The latter is coated with semihard rubber, and is also heated to effect the spotbonding.

Figure 3:
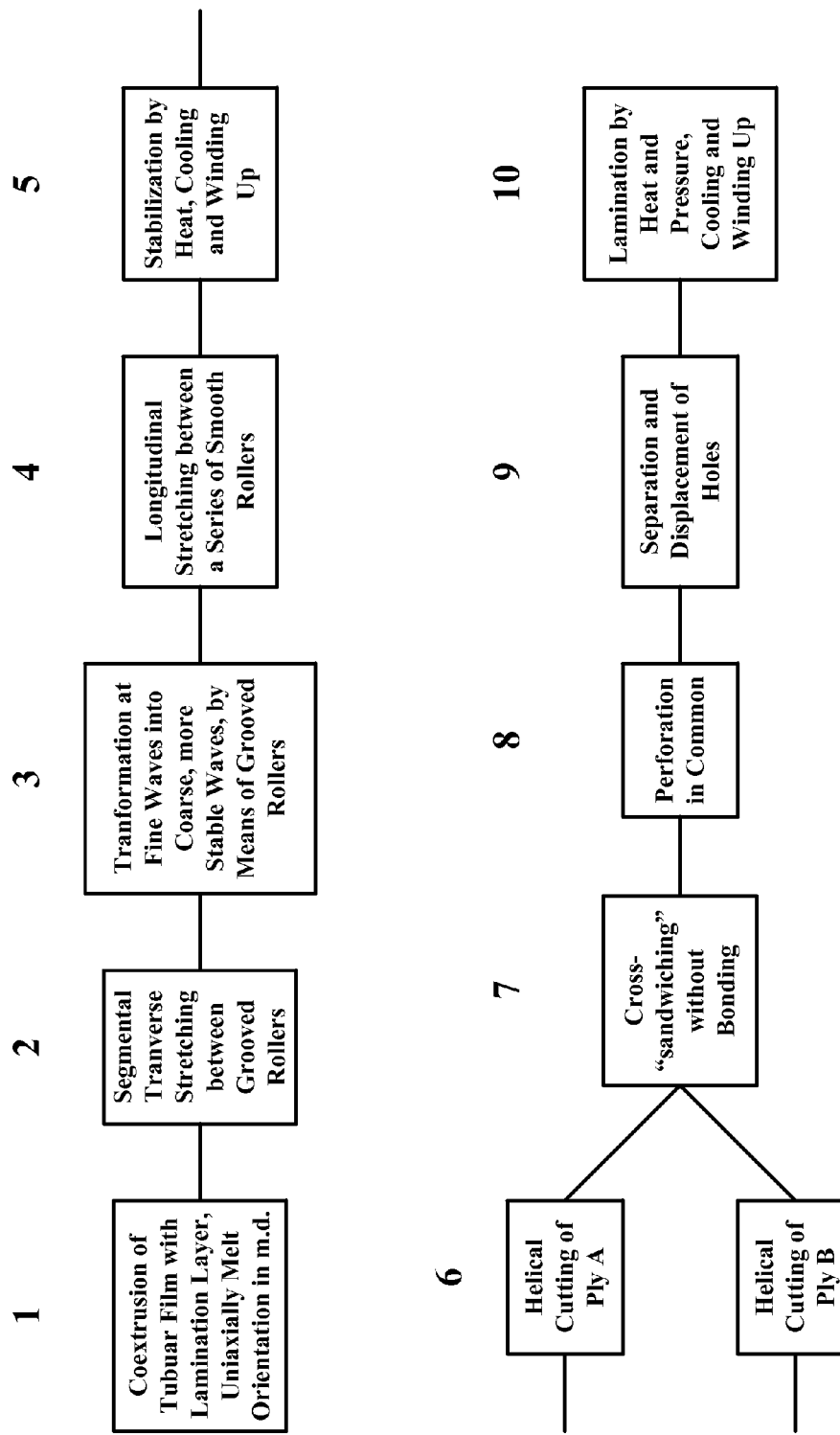
FIG. 3 are two flowsheets showing two lines which together establish the process according to another embodiment of the invention, namely the embodiment in which the surface irregularities are formed as continuous longitudinal bosses by transverse stretching between grooved rollers, and the film thereafter is longitudinally stretched, while it is in tubular, lay-flat form, then helically cut, perforated and cross laminated.

The five different steps in the line shown in the first flowsheet in FIG. 3 are all in themselves well known. These steps shall now be described in further detail. The process starts with extrusion of tubular film, whereby there must be coextruded a lamination layer on the exterior side of the tube. There is preferably created a generally uniaxial meltorientation during the haul-off from the extrusion die. This is usually sufficient for an adequate carrying out of steps 2)-4), but it is also possible and may in the case of low longitudinal meltorientation to insert an extra step of longitudinal stretching between steps 1) and 2), All the way from step 2) to step 5), i.e. after the tubular coextruded film has been collapsed, the latter is maintained in lay-flat tubular form. Step 2, i.e. the process step by which there is formed a fine pattern of bosses extending in the direction of orientation, is effected by means of intermeshing grooved rollers. The grooves are circular or helical, but in any case close to circular, and preferably each crest on the grooved surfaces of the rollers has two edges which are sufficiently sharp for producing a thin linear region in the ply. This serves to make the pattern of bosses particularly fine, thereby enhancing the ventilation and vapor transmission through the laminate as well as the resistance to hydrostatic pressure.

It was found that most regular linear zones can be formed when the grooves are circular and the intermeshing grooves rollers are rotated at slightly different circumferential velocities. There is hereby aimed at a shear parallel to the direction of orientation, and it is believed that a velocity difference which produces, in combination with the intermeshing between the grooved rollers, a pulling force under about 45° to the direction of orientation, will be ideal for optimization of this effect. The step 2) process and apparatus are further explained below in connection with FIG. 5.

With respect to step 4), it was found that the highest longitudinal stretch ratio and in general the best strength properties can be obtained when the "semifibrillated" film material is allowed to contract in width, preferably almost freely. To get the safest process and obtain conveniently high stretch ratios, this step is preferably carried out between two or more closely spaced rollers moving at different circumferential velocities. Before entering these stretching rollers, the ply is preferably brought into a pleated state with the pleats parallel with the direction of stretching. The pleating must be sufficiently deep to facilitate the stretching, but sufficiently low to avoid that the pleats remain after the stretching. The film leaving step 2) will be quite deeply pleated in a fine pattern, but due to some elastic recovery it has a strong tendency to widen, and unless precautions are taken, this tendency marked the pleats very uneven after a short travel, this tendency makes the pleats very uneven after a short travel. One applicable precaution is to tenter out the pleats e.g. by means of banana rollers, and then make new and larger pleats with suitable devices, without causing further transverse orientation. Such devices are known from U.S. Pat. No. 3,233,029. An alternative and more practical precaution is the one indicated as step 3) in the flowsheet, namely immediately after step 2) to take the film material through at least one second set of intermeshing grooved rollers, which have a pitch somewhat larger than the pitch of the step 2) grooved rollers, whereby the intermeshing of this second set is adapted to convert the waves leaving the step 2) grooved rollers to waves of bigger wavelength without performing any significant further transverse stretching.

It is advantageous to carry out the step 4) orientation at a temperature around or below 50° C., at least when the polymer material is based on PP or HDPE. A subsequent heat treatment, step 5), e.g. at about 90-110° C., will then be needed in order to avoid shrinkage in connection with the lamination under heat and pressure. In connection with the heat treatment, the film must be allowed an almost free shrinkage in its longitudinal direction. This longitudinal shrinkage will inherently cause a certain transverse expansion, which tends to make the film wrinkled, and such wrinkles must be removed by suitable tentering means, e.g. banana rollers.

In the second process lines of FIG. 3, steps 6), 7) and 10) are well known from present cross lamination technology.

Thus, step 6) is known from U.S. Pat. No. 248,366 (Rasmussen). However, the segmental transverse stretching between grooved rollers (step 2) may cause the two sides of the lay-flat tube to block strongly together even though there should normally not be any contents of lower melting bonding component on the internal surface of the extruded film. However, this blocking can conveniently be eliminated by a bubble of air, which is kept entrapped between two pairs of niprollers installed in the "tumbling" unwind part. This unwind part is shown in the above mention US Patent.

Cutting angles close to 60° or close to 30° are generally recommendable as giving a tear propagation resistance in the final laminate which is significantly higher than the tear propagation resistance of a corresponding 45° cross laminate. The "tumbling" unwind part of the helical cutter should preferably be of a very robust constriction, capable of carrying and "tumbling" heavy reels of film, thereby reducing the time to change reels to a minimum, and it is noted that some present manufacturers of cross laminates have helical cutters which can carry and tumble reals of weight 3 tons and length 2.7 meters.

Figure 4:
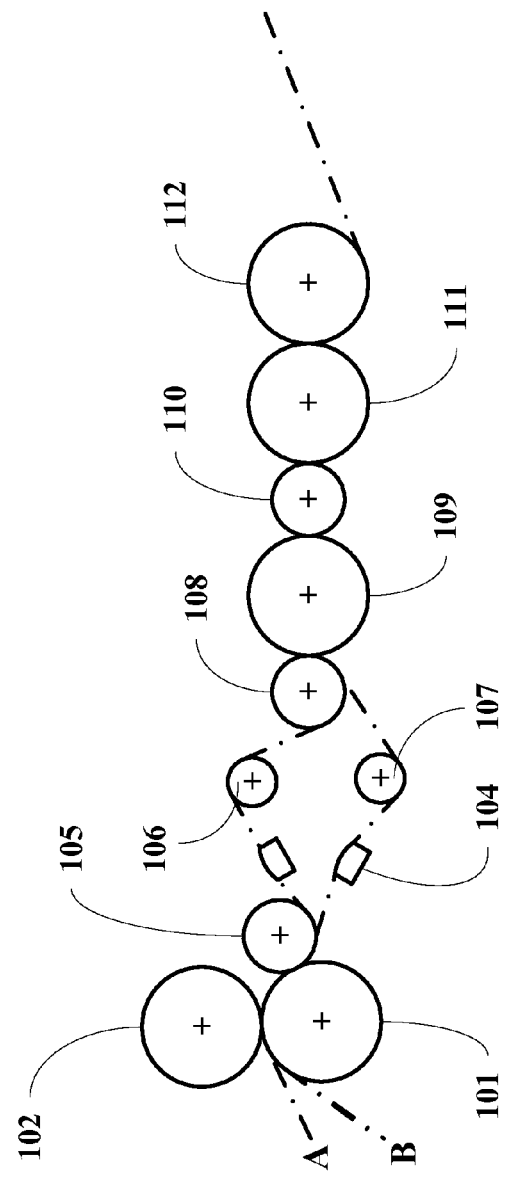
FIG. 4 which corresponds to the lower one of the two flowsheets shows the line of apparatus which perform perforation of the two plies A and B together, then separate A and B, displace the perforations in A and B by giving them different lengths of travel, and finally laminate A and B.

In FIG. 4, the helically cut plies A and B are fed from each one's helical cutter (not shown) to roller (101), where they are laid one upon the other with crisscrossing arrangement of the patterns of bosses and of the orientations, i.e. they are "cross-sandwiched", step 7) in FIG. 3. The counter roller (102) is a pin roller driven at the same circumferential velocity as (101). Corresponding to the pins in (102) there are grooves or cavities in (101) to allow the perforations. Between the helical cutters and roller (101) A and B are transversely tentered e.g. by means of banana rollers in order to avoid wrinkles. The banana rollers, the pins on (102) and the grooves or cavities in (101) are not shown. The pins may e.g. be hypodermic needles which form the perforations by cutting action and leave a small "flap" adjacent to the hole. This is step 8) in FIG. 3. The cutting surfaces on the tips of the hypodermic needles are turned in such a direction that the flaps sit on the upstream side of the hole, whereby they conveniently by movement over a frictional surface can open the passage to the hole and can be laid down flat. The flaps on plies A and B are laid down by means of the frictional surfaces (103) and (104), respectively. These frictional surfaces can e.g. consist of emery cloth.

Plies A and B are separated by means of the idle rollers (105), (106) and (107), whereby the position of roller (106) or (107) is adjustable to effect and adjust the displacement between the perforations in A and B, step 9). All rollers are practically parallel with each other, but roller (106) or (107) has adjustment means which enables a fine adjustment of the lateral position of the perforations in A relative to the lateral position of the perforations in B. The frictional surfaces (103) and (104) can be substituted by shaving blades, preferably in fast vibration perpendicular to the movement of A and B. Another alternative, which is preferable for obtaining optimum strength properties of the laminate, is the hot perforation process explained below in connection with FIGS. 9*a* and 9*b* and FIG. 10.

The level of bonding strength is a compromise, as usual in cross lamination technology. On one hand the product must not too easily delaminate under use, on the other hand a high bonding strength will cause poor tear propagation resistance. A proper level of bonding is achieved by a suitable choice of lamination layer. Furthermore this must be chosen such that the bonding can take place at a temperature which is lower that the temperature at which the plies have been stabilized (step 5) in FIG. 3) otherwise there will be a strong tendency to transverse shrinkage on rollers (110) and (111). The lamination layer should normally be chosen as a blend between two compatible polymers, which have significantly different melting points, one being lower than the stabilization temperature, whereby the lamination layer is only part-molten at the lamination temperature. See in this connection example 1.

In order to fully avoid shrinkage on rollers (110) and (111), there may be holding means gripping the edges of the laminate, e.g. a row of pins on the rollers adjacent to each edge of the laminate, and corresponding grooves in the counter rollers into which the pins can fit.

Figure 5:
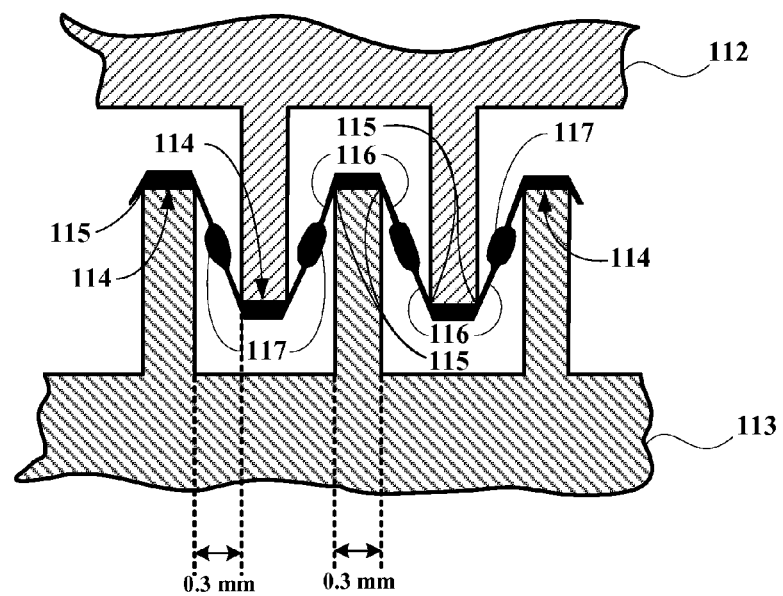
FIG. 5 shows two intermeshing grooved rollers, which produce the surface irregularities in form of continuous longitudinal bosses; the indicated measures are examples only.

With reference to FIG. 5, the mutually intermeshing grooved rollers (112) and (113) which effect the segmental transverse stretching, i.e. step 2) in FIG. 3, have flat crowns (114) on their circular teeth (flat seen in cross-section) with relatively sharp edges (115). The segmental stretching starts on these edges and develops into thin continuous regions (116). The intermeshing is limited such that there are maintained thicker material, bosses, on the flat crowns (114) of the circular teeth.

The radius of curvature on the "sharp edges" is of importance. It depends on the properties of the coextruded film, but should normally be within a range of about 20-50 µm.

A suitable industrial method of making a relatively exact adjustment of this curvature is first to make the edges really sharp, then round them by electrolytical polishing, and finally carry out electrolytical Cr-plating. These electrolytical processes must of course take place under precisely established conditions.

In FIG. 5 the width of the thin regions is shown to be about equal to the width of the bosses. In this embodiment of the invention it is preferred that the thin regions in the final product should be narrower than the bosses to give the product good stability. However, FIG. 5 shows the cross-section of the laid-flat tubular film while it is tentered, and the width of the thin regions will be reduces when it leaves the grooved rollers. Furthermore this width becomes pronouncedly reduced during the subsequent longitudinal stretching. At the same time the bosses undergo a very essential reduction of thickness, by a factor almost equal to the stretch ratio, while the relative reduction of thickness in the thin regions is much less.

Figure 6:
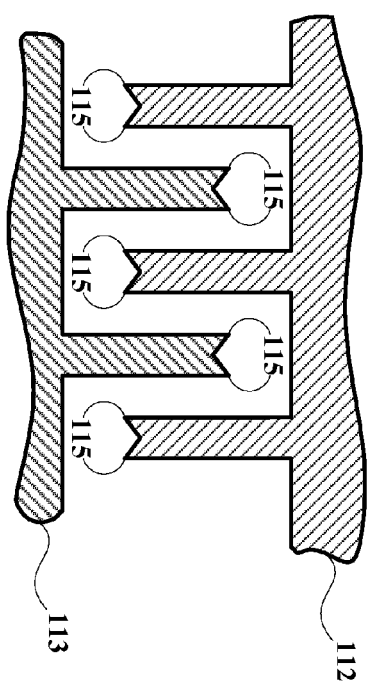
FIG. 6 shows a modified form of FIG. 5's grooved rollers and is an axial section through a surface of the roller

The purpose of making relatively sharp edges on the circular teeth of the grooved rollers is to make the pattern of embossment particularly fine. The precision of this embossment is enhanced by the profile of the teeth which is shown in FIG. 6. Here the crowns are not flat, seen in cross-section, but have a concave shape. This form of grooved roller has probably not been used in the art for any purpose.

In a modification of the FIG. 3 manufacturing process the helical cutting is avoided. Both plies are longitudinally cut and unfolded to flat film right after the extrusion. Ply A then is subjected to process steps 2)-5) and 7)-10) all in line, i.e. without winding-up at the end of step 5). Ply B is not subjected to the step of embossment (step 2), and step 3) in this case is transverse stretching, but otherwise the steps for ply B are the same as the steps for ply A. The stretching is preferably carried out by the method disclosed in WO-A-2005/102669. When this laminate is used as roof underlay or "house-wrap-film", the embossed side should preferably be the side which comes under direct water pressure.

Figure 7:
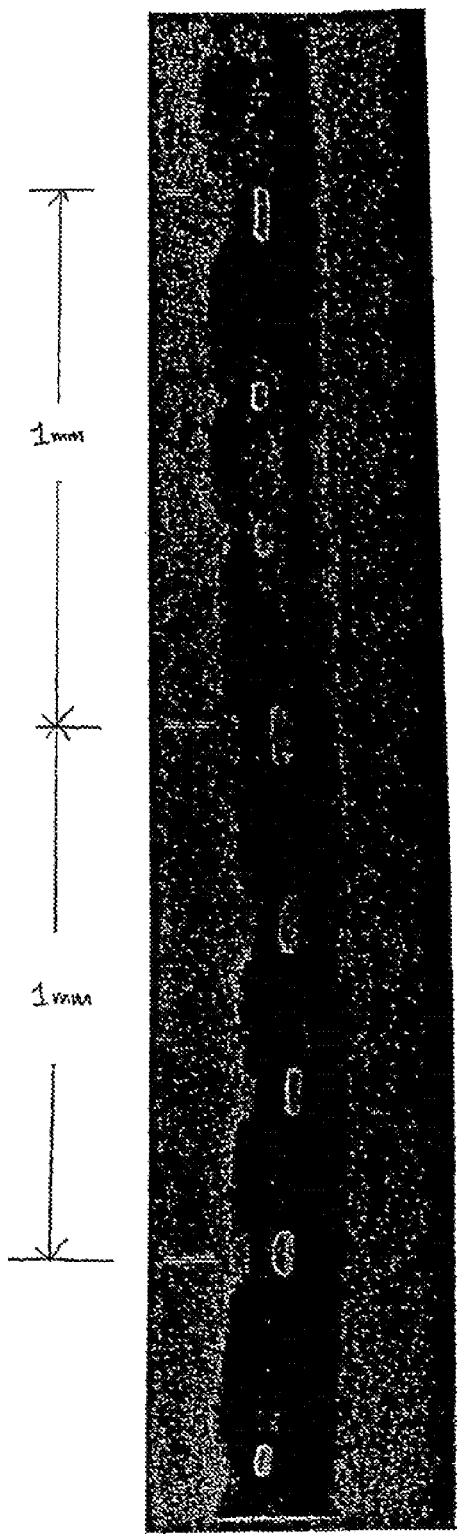
FIG. 7 is a microphoto of the cross-section of
a) a longitudinally orientated ply A, which before the orientation was supplied with a linear embossment parallel with the direction of orientation, and
b) a transversely orientated ply.

The microphoto of a cross-section, FIG. 7, shows such a laminate, in which one ply is supplied with bosses by means of the segmental stretching explained in connection with FIG. 5, and the other ply is without any bosses. The section shown does not go through any perforation. The sample from which the microphoto was made was taken from the trial recorded here as example 2.

The microphoto was retouched for the sake of clarity.

Figure 8B:
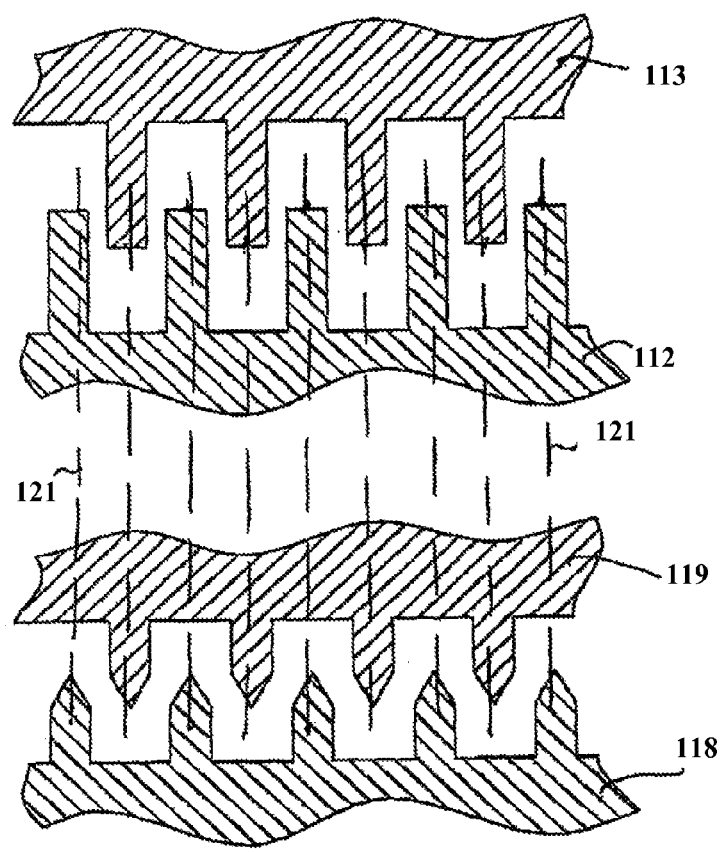

In FIGS. 8*a* and 8*b*, one of the two pairs of grooved rollers, namely (118) and (119) have only one relatively sharp edge on the crest of each circular tooth, namely (120) in the middle of the tooth. The teeth on (118) and (119) are mutually intermeshing, each making one stretching zone (thin region), and the two pairs of grooved rollers are in "registration" such that the middle of each tooth on roller (119) almost touches the middle of a tooth on roller (112). In FIG. 8*b*, the registration is indicated by the dash-lines (121). Means for securing exact "registration" between grooved rollers in the manufacture of the latter are known from WO-A-02-102592. As a result of this "registered" transverse stretching the film will have formed two bosses (122) on each crest of rollers (112) and (113), and thereby a still finer pattern of embossment is achieved.

In FIGS. 8*a* and 8*b*, rollers (112) and (113) are installed downstream of rollers (118) and (119). It can also be the other way, namely that the former are installed upstream of the latter, and it depends on the properties of the extruded, meltorientated film which one of the two options is chosen.

Figure 9A:
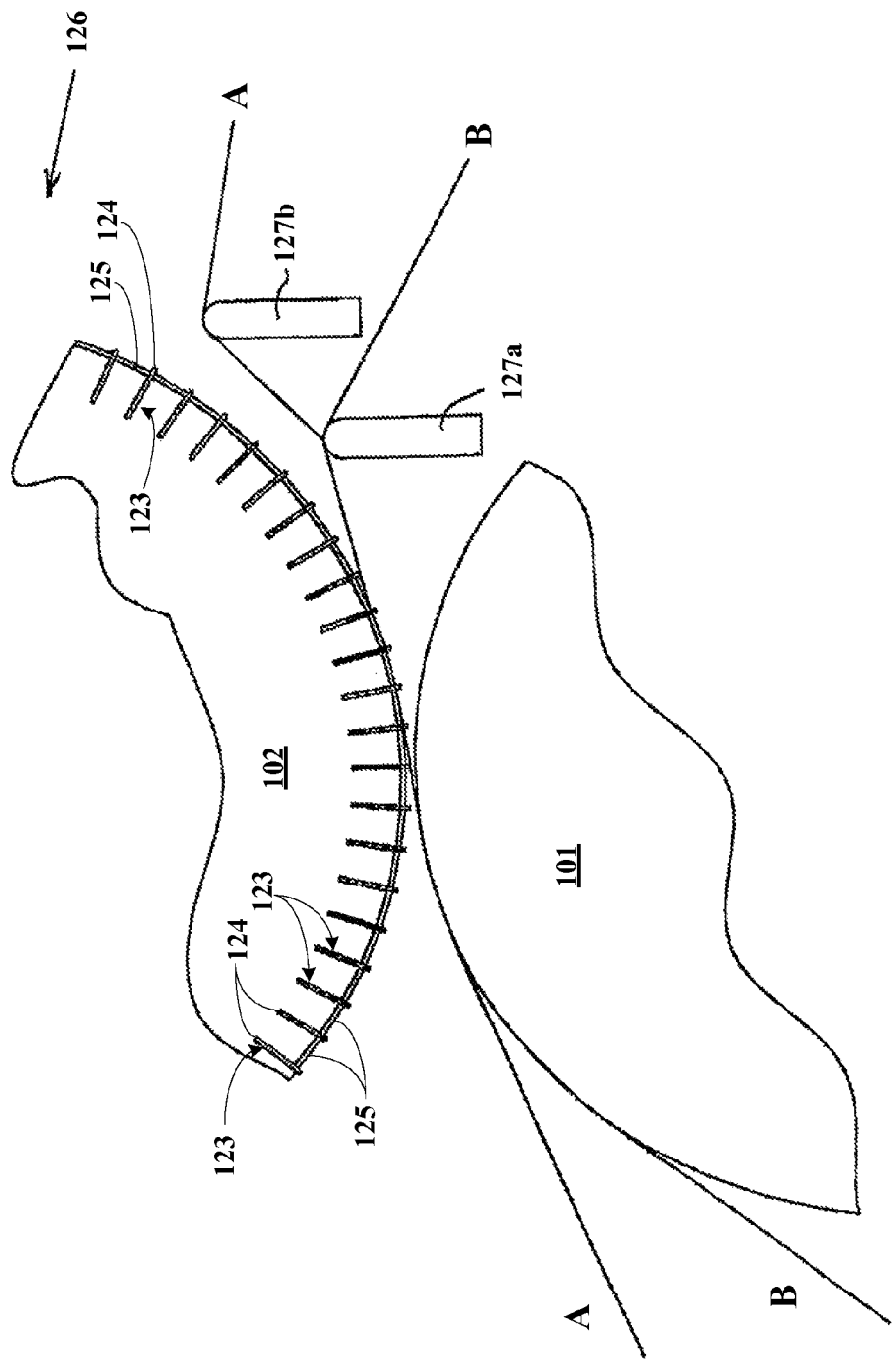
FIGS. 9a and 9b represent the roller set-up for perforation with hot serrated blades.
Figure 9B:
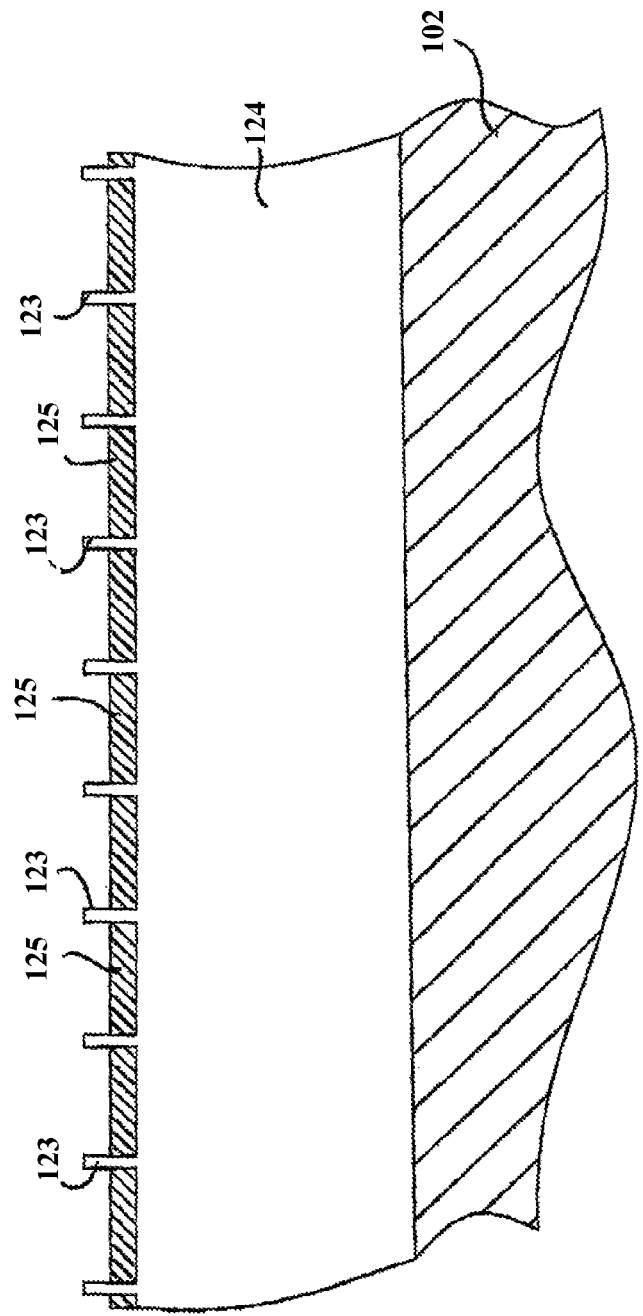

In FIGS. 9*a* and 9*b*, step 8) of FIG. 3 is carried out differently from the process explained in connection with FIG. 4, namely by hot perforation. The needles are here substituted by serrations (123) on blades (124). These blades are assembled in grooves around the circumference of roller (102) which now is a heater roller, but otherwise corresponds to the needle roller (102) explained in connection with FIG. 4. There is also a driven counter-roller (101) on which plies A and B are laid one upon the other with criss-crossing directions of orientation ("cross-sandwiched"). Here the two rollers are close but still at a distance from each other. Therefore there are no grooves or cavities in roller (101) to match the "teeth". When the "cross-sandwiched" plies A and B have been transferred from roller (101) to roller (102) they follow the latter over a short distance, sufficient to make the hot serrations perforate both plies under local melting. Heat insulating material (15), e.g. glasyarn wound around roller (102) between serrations (123) avoid contact between the plies and other hot rollerparts. The arrow (126) indicates that a mild flow of air constantly is blown unto the surface of roller (102) at the place shown by the arrow. Hereby the heat insulating material is kept sufficiently cold.

As a side effect of the hot perforation, plies A and B become bonded together through molten material around each perforation. These bonds must be eliminated by peeling before the molten material solidifies. It has been found that this peeling, when done quickly enough, does not cause any formation of fibrous protrusions. The peeling takes place under use of bars (127*a*) and (127*b*). Hereafter mutual displacement of the perforation and lamination is carried out as explained in connection with FIG. 4.

Suitable dimensions of the serrations on the blade are e.g. cross-section 0.2 mm×0.2 mm and length 0.8 mm. The cross-sectional dimensions 0.2 mm×0.2 mm are also suitable for needles which perforate by cutting at ambient temperature.

Figure 10:
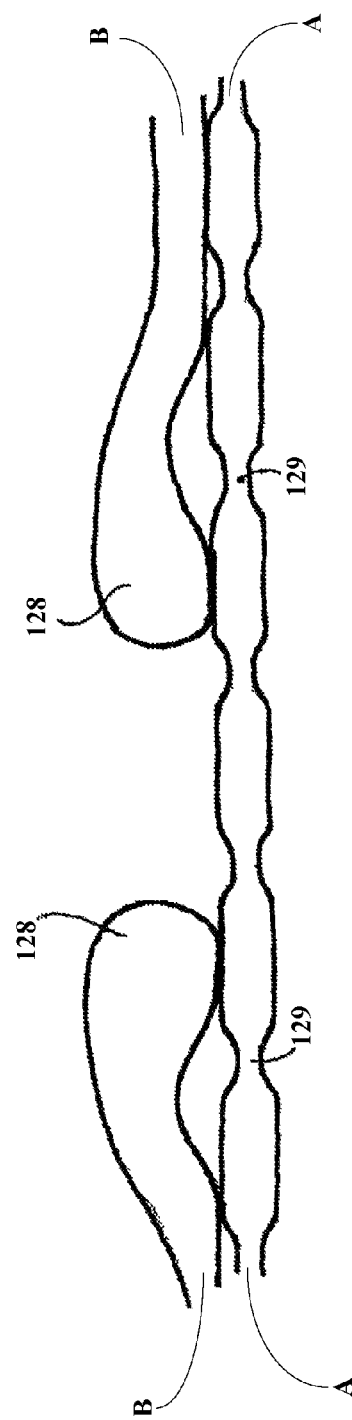
FIG. 10 shows, in principle, a section through the laminate, which section passes through the middle of a hot perforation. The section is parallel with continuous bosses in A and perpendicular to continuous bosses in B.

In FIG. 10, (128) shows the ring of molten, generally unoriented polymer material around each hot perforation. (129) are thin regions in A. Thin regions in B are not shown since it is considered that the section follows a boss in B. The ring causes a pronounced cavity between A and B in the immediately surrounding part of the laminate, but this portion is not wide enough to disturb the resistance to hydrostatic pressure.

Figure 11:
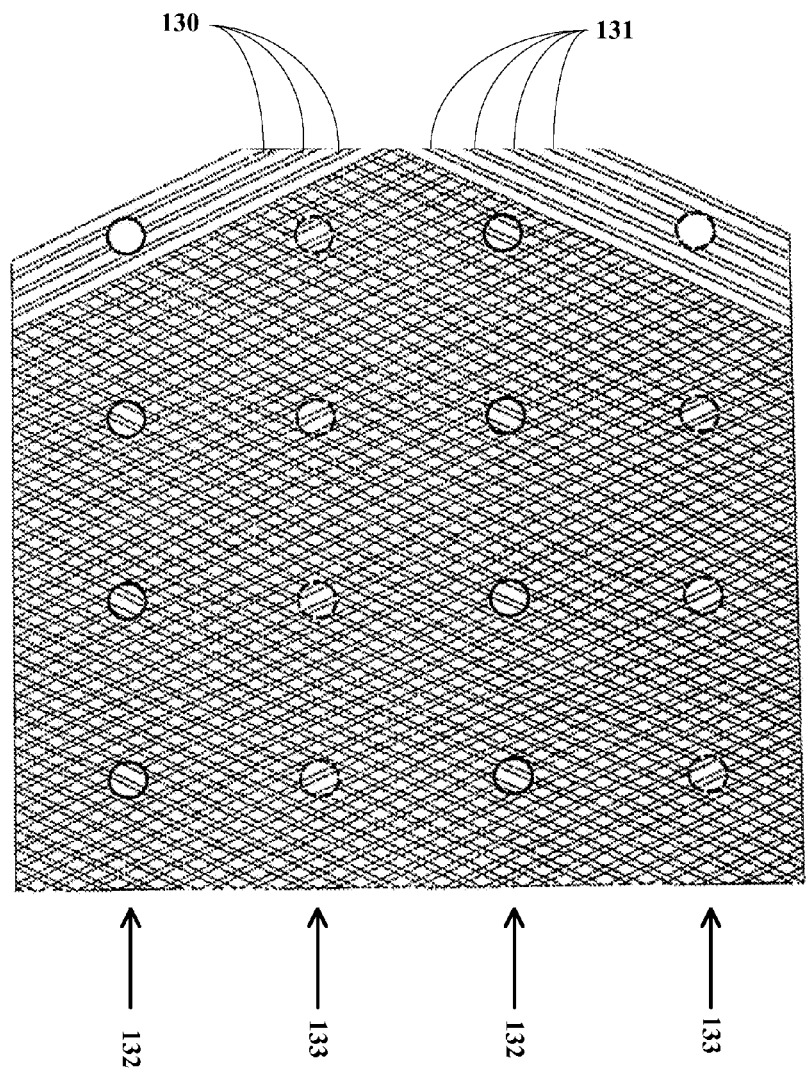
FIG. 11 is an example of an appropriate pattern of holes and embossment in plies A and B when both plies are supplied with continuous, linear bosses, and the bosses in the two plies criss-cross. The pattern is such that fluid never can take a straight route from a perforation in A to a perforation in B, thereby optimally utilizing the valve effect of the thin regions between the bosses.

In FIG. 11, the double lines (130) indicate the thin regions in ply A and the double lines (131) indicate the thin regions in ply B. The rows of fully drawn circles indicated by the arrows (132) show the perforations in ply A and the dotted circles indicated by the arrows (133) show the perforations in B. The machine direction during lamination is shown by arrow (134). The perforations are arranged in linear transverse rows in each ply with a perforation-division of 2 mm in each transverse row, and a row-division of 4 mm. The displacement process has arranged the perforations in ply B exactly in the middle between two adjacent holes in A. Apart from the selected angular arrangement of the thin regions (130) and (131) there is no order in the location of these thin regions relative to the perforations, however as it appears from the drawing, a fluid entering any hole in A, can never through a direct route following thin regions (131) in B, reach any perforation in B. To do so it has to flow at least some distance along at least one of the thin regions (130) in A.

Figure 12:
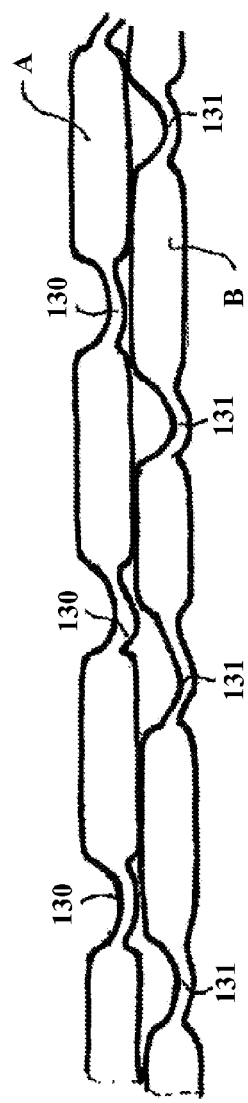
FIG. 12 is a longitudinal section through the film shown in FIG. 11 when it has been under influence of pressure from a fluid on one side of the laminate. This drawing illustrates the valve effect of the thin regions between the bosses.

The significance of this appears from FIG. 12. It is here considered that ply A is in direct contact with a fluid which is under pressure sufficient for bending the thin regions as shown. Such bending exerts a valve effect, which tends to close the passageways which follow ply A's thin regions (13) by bending (13) against bosses in B and to open the passageways which follow ply B's thin regions (131). When an internal flow from perforations in A to perforations in B always has to pass one or more of the channels formed by (130), the net result is a closing affect, which is helpful for obtaining high resistance to hydrostatic pressure.

The shown patterns of thin regions and perforations is only an example of this valve effect. The valve affect can be enhanced by giving the laminate a permanent structure as that shown in FIG. 12. For this purpose a hot fluid, preferably air under a suitable pressure can be passed through the laminate. This can e.g. be carried out by drawing the laminate under longitudinal tension over a microporous heated bar while blowing pressurized air through the pores of this bar. The surface of the bar can conveniently be rounded like the surface of a roller. The heat will stabilize the bent shape, but the temperature of the air should not be so high that a significant transverse shrinkage will occur. For polyethylene or polypropylene based laminates a temperature around 70-80° C. will be convenient. Edge/guide means may be applied to eliminate transverse shrinkage. Longitudinal shrinkage is avoided by the longitudinal tension.

Figure 13A:
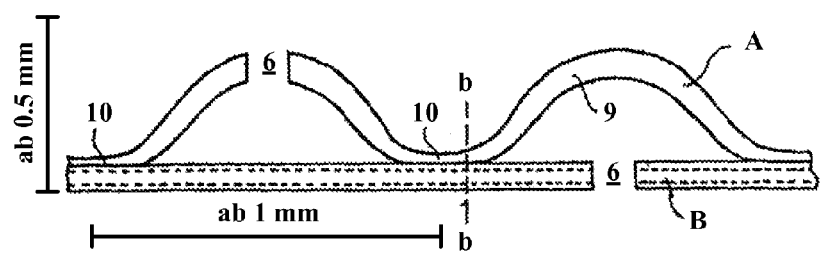
FIGS. 13a and 13b shown an embodiment of the invention in which ply A is fluted and ply B flat, but supplied with bosses, which together with the basis of the flutes in ply A, form the interfacial capillaries
Figure 13B:
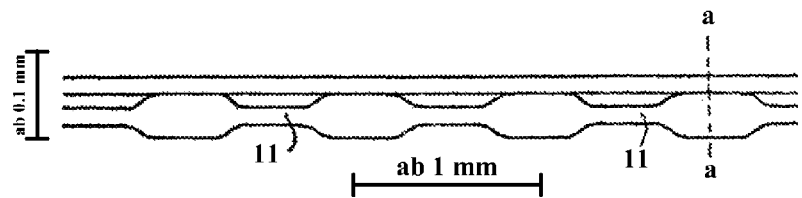

In FIGS. 13*a* and 13*b* a part of the interfacial channel system is channels formed by the flutes (9), while the constrained part of the channel system is formed between the basis (1) of the flutes and ply B by thinner segmentally stretched, linear zones (11) in B. FIG. 13*a* is a section perpendicular to the flutes (which may extend longitudinally or transversely) shown as a-a in FIG. 13*b*, while FIG. 13*a* shows a section perpendicular to this, namely section b-b in FIG. 13*a*. For the sake of clarity, the two plies are shown thicker than they normally would be. In order to facilitate the fluting operation, the basis part (10) of each flute is preferably thinner than the free parts of the flutes. Explanation of this is given in example 4. Each ply A and B. has a lower melting surfaces layer for lamination of A to B, the layered substructure is disregarded in the drawings.

Figure 14:
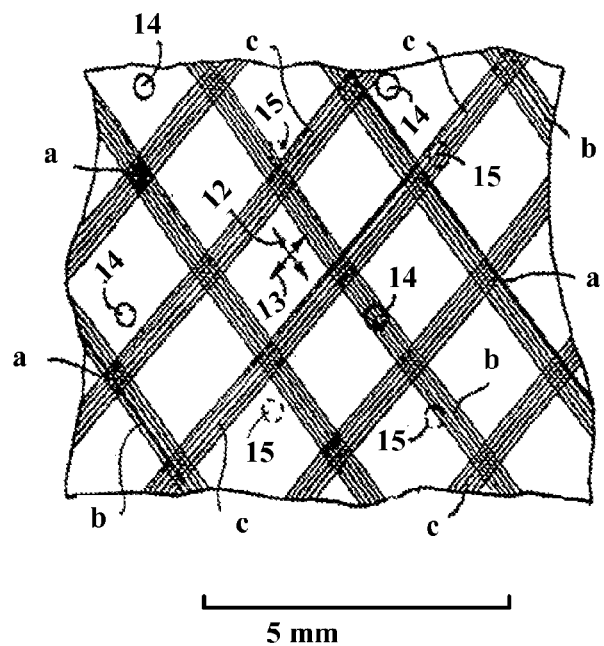
FIG. 14 represents a cross laminate according to a third embodiment of the invention in which the bosses, which establish the gap at the interphase, are formed by meltfracture or by addition of particulate material in the surface layers, and the bonding is a spot-bonding where two arrays of coextruded strands cross each other. In the sketch the laminate is viewed towards one of its main surfaces and is considered transparent apart from the hatched crisscrossing strips, which show the coextruded strands of bonding lower melting temperature component.

In FIG. 14 the strips (b) on ply A have been coextruded on one tubular film, and the strips (c) on ply B have been coextruded on another tubular film. This coextrution is carried out according to WO 03/074264.

At this step of the manufacturing process, the strips extend longitudinally, and the angular arrangement was achieved by spiral cutting. Between these strips and a main layer in each of these films there was extruded a thin continuous layer filled with particles such as diatomeric earth causing surface roughness in the, form of bosses, alternatively, melt fracture could be utilized. This filled layer was not made of lower melting polymer material and therefore did not bond in the lamination process. The bonding is a spotbonding confined to the spots (a) where (b) and (c) intersect. The sub-ply in A which faces B, i.e. the sub-plies which contains the strips (b) is oriented in the direction shown by arrow (12), and the sub-ply in B which faces A and contains strips (c) is oriented in the direction shown by arrow (13). Perforations (14) in A are shown by full circles, and perforations (15) in B by dotted circles. They are mutually displaced, but there need not be coordination between the strips and the perforations. Due to the surface roughness, fluid can pass between the perforations in the two plies, and the passage is very narrow, creating resistance to hydrostatic pressure.

Figure 15:
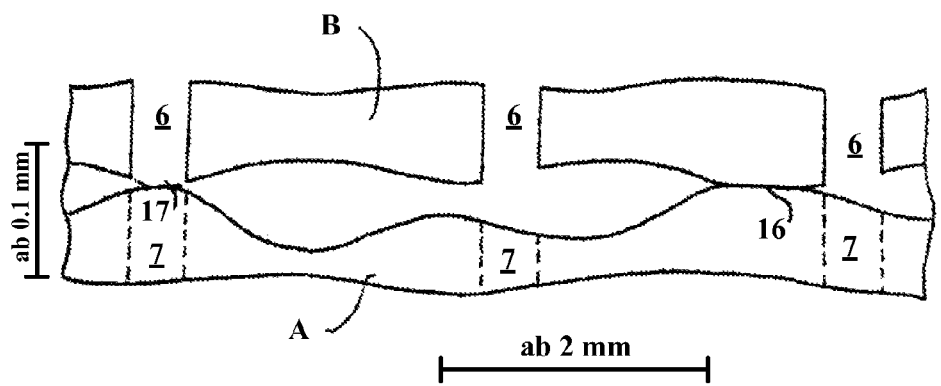
FIG. 15 represents still another embodiment of the invention, in which each ply have longitudinally extending thinner/thicker regions as an inherent result of transverse orientation between grooved rollers, which transverse orientation extends over the entire film surface.

FIG. 15 shows a cross-section of a laminate according to still another embodiment of the invention. Each ply A and B in itself is a crosslaminate, and the bonding between A and B takes place through lower melting surface layers, but this is not shown in the drawing. As further explained in Example 5, each ply has longitudinally extending thinner/thicker regions, which feature inherently is a result of transverse orientation between grooved rollers, and normally is considered a drawback, but in this embodiment of the invention has been beneficially utilized. It is intended that the undulations in the surfaces which face each other, on one ply are relatively deep, and on the other ply are shallow (as straight as practically possible when using grooved rollers for transverse stretching). Due to this structure, the two plies can become laminated with the bonding following a part of the longitudinal bosses, here shown as locations (16) and (17). The perforations in ply A must be longitudinally aligned with the perforations in ply B, but there is no practical possibility of bringing them in registration with the pattern of bonding. If this pattern of perforation is a regular pattern, the distance between rows of perforations should be sufficiently different from the pitch (wavelength) of the pattern of bonding to avoid interference. It does no harm for a minor part of the perforations to be closed by the bonding as shown in the drawing at the left side.

Example 1

The purpose of this example is to produce and test a sample of House-wrapfilm, in principle by the process shown in the two flowsheets in FIG. 3, and using the equipment which is equivalent to the apparatus of FIGS. 4 and 5, however, more adapted to laboratory conditions.

The first step is manufacture of a coextruded tubular film from HDPE of m.f.i.=0.1 covered on its interior side with about 15% surface layer which consists of LLDPE having m.f.i=1.0, and on its exterior side with 10% of a polymer blend adapted to produce at an appropriate temperature a bond not so strong that tear propagation resistance becomes too low, and not so weak that delamination becomes a problem. Appropriate temperature means that the lamination temperature must be so low that shrinkage of the oriented, heat stabilized films can be avoided by use of simple edge-holding means. For this purpose there is chosen a blend of 85% of the above mentioned LLDPE and 15% of a metallocene VLDPE which starts melting at about 50° C. and has the same mfi, trade name Affinity 8100.

The blow ratio is limited to about 1.2:1, the gap of the exit orifice is 1.5 mm and the final thickness of the extruded film 120 μm. There is hereby introduced a relatively high melt orientation. The tubular film in lay flat form is embossed by segmental, transverse stretching, then in line herewith longitudinally stretched in ratio 3:1 and finally, still in line, heated to 90° C. on rollers and at this temperature allowed almost free contraction for stabilization.

The embossment by segmental, transverse stretching is carried out at 40° C. in the manner shown in FIG. 5. The thickness of the circular teeth is 0.3 mm and the division on each roller is 12.0 mm as also shown in this figures. The edges on the circular teeth have been rounded by hand, the radius of the curvature being about 50 μm. The intermeshing between the grooved rollers is adjusted such that in the final longitudinally stretched and stabilised film, the width of the bosses becomes about 4 time the width of the thin regions.

The longitudinal stretching is carried out between closely spaced rollers with smooth surfaces, also at 40° C. The width of the lay-flat tubular film after stretching is the same as the width before the stretching between grooved rollers.

The two sides of the lay-flat tube block quite strongly to each other as a result of the treatment between the grooved rollers, but is easily opened to tubular form by a bubble of air trapped between the two sides, and it is spiral cut under an inclination of 1:2 to its longitudinal direction. Due to the stretching processes, the gauge of the film is now 40 μm.

Two lengths of this film are cross-"sandwiched" and taken though a line equivalent to the line shown in FIG. 4. However, for the sake of simplification, the perforations are carried out by means of a reciprocating bar, on which one row of needles is assembled. The needles are hypodermic needles. There is a counter-bar supplied with a groove fitting with the needles so as to assist in the perforation process. The transverse pitch of the perforations is 2.0 mm, and by coordination between the frequency of the reciprocation and the advancement of film, the longitudinal pitch is adjusted to 4.0 mm. After the mutual displacement of the perforations in the two films, the longitudinal distance between each hole in one film and the adjacent holes in the other film is 2 mm. The lamination takes place at 80° C. Ten specimens of the laminate were tested for resistance to hydrostatic pressure. The results varied between 25 and 35 cm of water.

Example 2

The purpose of this example is to produce and test a sample of House-wrap-film, made by modification of the FIG. 3 process in which one ply (a) is longitudinally embossed by segmental stretching between grooved rollers, and the other ply (B) is given transverse orientation without being subjected to any embossment. Ply A is the film produced according to example. 1 above, by coextrusion, stretching between grooved rollers, longitudinal stretching, heat stabilisation and opening of the two sides of the lay-flat tube. However, the tubular film is cut longitudinally instead of helically.

Ply B is coextruded under the same conditions as ply A, but, as mentioned above, it is not subjected to embossment. As a matter of simplification of this laboratory trial, it is not subjected to tenter-frame stretching or the like, but is first longitudinally oriented and heat stabilised as it shall be explained below, then cut into many short lengths. The latter are joined side-by-side by heat sealing in such a way that together they form a long transversely oriented web.

The longitudinal orientation takes place at 40° C. at a ratio of 4:1, measured after the heat stabilisation and is carried out between closely spaced rollers. Prior to the stretching, the film is supplied with fine longitudinal pleats in a degree which almost matches its normal tendency to transverse contraction ie the distance from edge to edge is reduced by the pleating to about 75% of the true width of the lay-flat film. The contraction makes the pleats disappear during the stretching. The subsequent stabilisation by heat and shrinkage is carried out as explained above in example 1.

Ten specimens of the final cross laminate were tested for resistance to hydrostatic pressure with ply A, i.e. the embossed ply, being under the direct pressure, the results varied between 30 and 40 cm of water.

Example 3

The purpose of this example is to produce and test the laminate shown in FIG. 1.

The first step is manufacture of a coextruded tubular film from HDPE of m.f.i.=0.1 covered on one side with about 20% surface layer which consists of metallocene LLDPE having a melting point of about 100° C. The blow ratio is limited to about 1.2:1, the gap of the exit orifice is 1.5 mm and the final film thickness is 40 µm. There is hereby introduced a relatively high melt orientation. The tubular film, in lay-flat form, is then longitudinally stretched in ratio 4:1 at 40° C., and in line herewith is stabilized as explained in example 1. The stretching process is carries out between closely spaced rollers. Prior to the first stretching process, the film has fine longitudinal pleats similar to those explained in example 2, but now the distance form edge to edge is reduced by the lay-flat film.

The oriented lay-flat tubular film, now of gauge 25 µm, is helically cut under an angle of 45°. This produces a film which is oriented under an angle of 45°. Two such films are continuously extrusion laminated with a 5 µm thick layer of LLDPE between, the orientations in the two films crossing each other under an angle of 90°. The coextruded surface layers, which melt above 90° C. are hereby turned outward to form low melting layers on both sides of the laminate. The gauge of the laminate is 55 µm.

In laboratory trials, one small sample of this film is embossed and laminated with another unembossed sample of the film. The embossment is carried out between two plates, one supplied with protruding knobs and the other with holed. The diameter of the knobs is 1 mm and their distance from center to center is 4 mm. The plate with knobs is heated to 110° C. while the plate with holes is kept at room temperature, the two rollers are bolted together and a number of samples made with different boss heights. In each case the hot roller plate, still holding the embossed film sample, is transferred to and pressed against the unembossed film, which is mounted on another steel roller, the latter covered with semi-hard rubber, and also heated to 100° C. Hereby the bosses laminate to the unembossed film sample, while the rest of the interphase between the two samples remains unbonded. Prior to the lamination the two samples are perforated by hand in the displaced manner shown in FIG. 1. Finally the resistance to hydrostatic pressure is tested for each pair of samples, which have been produced in this way. A resistance of 10 cm of water was achieved at a distance of 35 µm.

Example 4

This example concerns the laminate shown in FIGS. 13a and 13b. The procedure of this example is exactly the same as in the. example of WO-A-02/102592, except for the following two extra process steps:
1) prior to the lamination, ply B is segmentally stretched to form the thin regions (11) shown in FIG. 13b of the present application. This segmental stretching is adapted to reduce the thickness by about 50% and is longitudinal i.e. the bosses and the thin regions extend transversely. Further more, rollers (11) and (10) shown in FIG. 8 of the above mentioned International publication, are heated to about 105° C., and roller (11) is coated with a semi-hard rubber. The pressure between rollers (10) and (11) is carefully adjusted to avoid bonding of the thin regions i.e. to create the narrow channels between the basis of ply A and ply B.
2) Both plies are supplied with perforations, ply A on the free crests of some of the flutes and ply B on opposite crests of other flutes.

Ply B is perforated prior to the lamination by means of the reciprocating system which is explained in example 1, with the needles exactly adjusted in relation to the hot knives which perforate the crests of ply A.

The perforations of A are carried out subsequent to the lamination by means of fine, short knives on the surface of a hot roller, so that the cutting becomes a combination of melting and cutting. Since the flutes are protruding it is possible to perforate the crests of the flutes in this manner without perforating though the laminate.

Example 5

The purpose of this example is to demonstrate a method to manufacture the laminate shown in FIG. 15. Ply A and ply B are both produced by the cross lamination procedure described in example 3 of U.S. Pat. No. 5,028,269 except as follows:
1) Each of these cross laminates, A and B, has on one of its sides, namely the one which was an outside layer before the separation mentioned in this publication, a layer of low melting metallocene LLDPE with a melting point in the range from 60 to 70° C. and m.f.i=1.
2) In the manufacture of cross laminate A, the cutting angle during the helical cutting is 30°, while in the manufacture of cross laminate B, this angle is 60°. In the further manufacturing process, A and B are each perforated and laminated in line herewith under conditions mentioned in example 1 with the two Affinity layers facing each other. The lamination takes place between two rollers heated to about 90° C., one coated with semi-hard rubber. Upstream of these rollers A and B are heated to this lamination temperature.

I claim:

1. A laminate of thermoplastic film materials exhibiting throughgoing porosity and comprising:
plies A and B,
the ply A having an inner surface A1 partly in contact with the ply B and an outer surface A2, and
the ply B having an inner surface B1 partly in contact with the ply A and an outer surface B2,
where the ply A and the ply B comprise continuous material except for a multitude of perforations in each ply, whereby substantially no perforation in the ply A corresponds directly to a perforation in the ply B,
where the lamination between the ply A and the ply B on surfaces A1 and B1 being:
a) through a coextruded lower melting lamination layer on the ply A and/or the ply B and
b) established in such a discontinuous manner that there is formed a channel system between the surfaces A1 and B1 connecting a majority of the perforations in the ply A each with at least one of the perforations in the ply B, and connecting a majority of the perforations in the ply B each with at least one of the perforations in the ply A, and
characterized in that each channel includes a barrier part having a gap as measured from the surface A1 to the surface B1 limited to about 200 µm or less, where the gap being formed by surface irregularities in the surface A1 and/or the surface B1 and where the surface irregularities comprise protruding thicker bosses and thinner receding portions, where the channels and the barrier parts withstand hydrostatic pressure and dynamic water pressure, but allow passage of vapor and air.

2. The method according to claim 1, wherein the surface A1 and the surface B1 are hydrophobic at least throughout the barrier parts.

3. The laminate according to claim 1, wherein over an area which forms the barrier part, the gap has an average size of no less then 3 µm.

4. The laminate according to claim 1, wherein either the ply A and/or the ply B in themselves are cross laminates, or both comprising oriented material each with a main direction of orientation, the two main directions of orientation crossing each other.

5. The laminate according to claim 1, wherein the surface irregularities in the barrier part are bosses created by impression in the ply A and/or the ply B.

6. The laminate according to claim 1, wherein the surface irregularities in the barrier portion are created by particulate material added to the ply A and/or the ply B.

7. The laminate according to claim 1, wherein the surface irregularities in the barrier part are in the form of meltfractures in the surface A1 and/or the surface B1.

8. The laminate according to claim 1, wherein the surface irregularities are in the form of randomly occurring stretching irregularities.

9. The laminate according to claim 1, wherein the surface irregularities comprising the protruding bosses and receding portions are constituted by segmentally stretched, narrow linearly extended receding portions of the ply A and/or the ply B, thereby creating narrow, linearly extending bosses.

10. The laminate according to claim 1, wherein there is a lamination layer on both the ply A and the ply B, each lamination layer being only present in a pattern comprising a linear array of stripes, the stripes on the ply A crossing the stripes on the ply B to form bonding only at spots where the two arrays intersect.

11. The laminate according to claim 10, wherein the bonding comprises spot-bonding or line-bonding established on and confined to all or some of the protruding bosses.

12. The laminate according to claim 11, wherein a distance between adjacent spot- or line-formed protruding bosses engaged in the bonding is no larger then about 1 mm.

13. The laminate according to claim 9, wherein in the ply with receding portions, the protruding bosses are uniaxially oriented substantially in their longitudinal direction, and the formation of the receding portions has been established by segmental stretching transverse to this direction.

14. The laminate according to claim 13, wherein both the plies A and B have receding portions, where the receding portions in the two plies criss-cross each other.

15. The laminate according to claim 13, wherein a division between the receding portions is no larger than about 0.3 to 0.4 mm.

16. The laminate according to claim 15, wherein a width of the receding portions is between about 0.05 to 0.2 mm.

17. The laminate according to claim 9, wherein the ply A is fluted with flutes defining channels which extend linearly in a longitudinal or a transverse direction, with the bases of the flutes bonded to a substantially flat ply B, whereby the flutes define channels which extend substantially in the longitudinal or the transverse direction of the laminate, a wavelength of the flutes being about 3 mm or less and a height of the flutes being about 0.3 mm or more, whereby the barrier parts of the channel formed connections are at the bases of the flutes where the ply A is bonded to the ply B, and are formed by segmentally stretched narrow, receding portions in the ply B which extend under an angle to the direction of the flutes.

18. The laminate according to claim 17, wherein the channels formed by the receding portions are hydrophobic as achieved by the choice of polymer materials, while at least a part of the channels formed by the flutes are hydrophilic either due to contents of a hydrophilic filling material in these channels or a hydrophilic coat on parts of the surface A1 which form walls of these channels.

19. The laminate according to claim 1, wherein at least one of the plies A or B has been impressed in the form of a pattern of parallel fine linear furrows.

20. The laminate according to claim 19, wherein both the plies A and B have such a pattern of impression on the surfaces which are bonded together, where the two patterns criss-cross each other.

21. The laminate according to claim 19, wherein a division of the pattern is about or lower than 10 µm.

22. The laminate according to claim 1, further comprising:
a ply C added on the surface A2 of the ply A,
where the ply C similarly being supplied with a big multitude of perforations which are offset relative to the perforations in the ply A and that similarly connecting channels between the two series of perforations are formed at the interphase, each such connection comprising a barrier part.

23. The laminate according to claim 22, further comprising:
a ply D added on the surface B2 of the ply B,
where the ply D similarly being supplied with a big multitude of perforations which are offset relative to the perforations in the ply B and that similarly connecting channels between the two series of perforations are formed at the interphase, each such connection comprising a barrier part.

24. The laminate according to claim 1, wherein the surfaces A1 and B1 comprise polyethylene at least where they form the barrier part of the connections.

25. The laminate according to claim 1, wherein a size of the holes formed by the perforations is about 0.1 to 0.4 mm and a distance between neighboring holes in one and the same ply is about 0.5 to 5 mm.

26. The laminate according to claim 1, wherein the perforations are surrounded by material which is substantially unoriented and thicker than the immediately adjacent material, achieved by perforating with local melting.

27. The laminate according to claim 14, wherein the perforations in the two piles A and B form a regular pattern, and the directions of the criss crossing arrays of receding portions have been coordinated with this pattern in such way that substantially no single thin portion in the ply B leads from any perforation in the ply A to any perforation in the ply B.

28. The laminate according to claim 27, wherein the receding portions in both the plies A and B are bent towards the surface of the laminate which also is a surface of the ply B, this bent shape preferably being a stabilized shape.

29. The laminate according to claim 14, wherein each of the plies A and B comprises a regular pattern of parallel linear regions, which are without receding portions, and have a width at least 10 times an average width of the receding portions.

30. A process for forming a laminate of thermoplastic films exhibiting throughgoing porosity, in which a ply A having a surface A1 is brought into contact with a ply B having a surface B1, with the surface A1 is in contact with the surface B1, and the ply A is laminated to the ply B comprising the steps of:

perforating the ply A and the ply B, registering the ply A and the ply B in such a manner that substantially no perforation in the ply A corresponds to a perforation in the ply B, heating and partially melting a co-extruded lower melting lamination layer on the ply A and/or the ply B, while the surface A1 and the surface B1 are in contact to form a lamination between the plies A and B, where the lamination between the ply A and the ply B is established in a discontinuous manner such that a channel system is formed between the surface A1 and the surface B1 connecting a majority of the perforations in the ply A each with at least one of the perforations in the ply B via channels and such that a majority of the perforations in the ply B is connected with at least one of the perforations in the ply A via the channels, and providing the surface A1 and/or the surface B1 with surface irregularities forming protruding thicker bosses and adjacent thinner receding portions whereby at least, in a barrier part of the laminate, there is formed a gap between the surface A1 and the surface B1 which is limited to about 200 μm or less.

31. The process according to claim 30, wherein both the surfaces A1 and B1 are provided with surface irregularities forming protruding bosses and adjacent receding portions.

32. The process according to claim 30, wherein one of the plies A or B is provided with such surface irregularities forming protruding bosses and adjacent receding portions and the other ply has no such surface irregularities.

33. The process according to claim 30, wherein the gap is formed by the adhesion of the surface A1 to the surface B1 by at least some of the bosses forming the surface irregularities, whereby the receding material adjacent to the bosses is not adhered to the opposite surface and forms part of the channel system.

34. The process according to claim 30, wherein surface A1 and surface B1 are hydrophobic at least throughout the barrier part and comprise polyethylene.

35. The process according to claim 30, wherein the plies A and B are perforated together and then mutually displaced in a longitudinal or transverse direction to form the channel system and are laminated together, all in line.

36. The process according to claim 30, wherein either the plies A and/or B in themselves are cross laminates, or both comprise oriented material each with a main direction of orientation, the two main directions of orientation crossing each other.

37. The process according to claim 30, wherein the perforation is carried out by use of needles or needle like items mounted on a roller.

38. The process according to claim 37, wherein the needles or needle like items are heated to perform the perforation under local melting of the film material.

39. The process according to claim 38, wherein perforation is carried out by using serrations on blades mounted around the circumference of a heated roller.

40. The process according to claim 39, wherein the serrations have a cross section of about 0.2 mm by 0.2 mm.

41. The process according to claim 30, further comprising the step of:

forming the bosses in the ply A and/or the ply B by forming spotwise impressions in the ply A or the ply B as the case may be using pressure between rollers with patterned surfaces such as to make one side of the ply recede and make the other side protrude in the spots.

42. The process according to claim 30, wherein the surface irregularities in the surfaces A1 and/or B1 are created in the coextrusion process by creating pronounced melt fracture.

43. The process according to claim 30, wherein the surface irregularities in the surface A1 and/or B1 are created in the coextrusion process by addition to the lamination layer of a suitable particulate material.

44. The process according to claim 30, wherein the orientation is carried out in the plies A and/or B under conditions to make this orientation spontaneously occur spotwise or linewise, thereby creating the bosses and the receding portions, or if they already are formed in the coextrusion process, making the surface irregularities deeper.

45. The process according to claim 30, wherein the receding portions in the plies A and/or B are produced by segmental stretching, between intermeshing grooved rollers, to make the bosses and the receding portions extend linearly.

46. The process according to claim 45, further comprising the step of:

prior or subsequently to the segmental stretching, stretching the ply in solid state to give at least the bosses a main direction of orientation substantially parallel with their longitudinal direction.

47. The process according to claim 45, wherein the segmental stretching is carried out by means of grooved rollers which have circular cogs to make the bosses and receding portions extend in the machine direction.

48. The process according to claim 45, wherein the segmental stretching is carried out by means of grooved rollers which have axially extending cogs to make the bosses and receding portions extend perpendicularly to the machine direction.

49. The process according to claim 45, wherein the segmental stretching is carried out by means of helically extending cogs to form the bosses and receding portions under an angle lower than 90° to the machine direction.

50. The process according to claim 47, wherein the crests of each cog has two edges of a sharpness adapted so that each cog forms two receding portions in the ply.

51. The process according to claim 50, wherein the crest has a concave shape when viewed in cross-section.

52. The process according to claim 47, wherein each ply A and B is extruded in the form of a tubular film, after solidification is segmentally stretched in form of a lay-flat tubular film to form bosses and receding portions which at least essentially are parallel with the machine direction, subsequently is helically cut to form a new machine direction under an angle to the linearly extending bosses and receding portions, and after these steps the two plies are subjected to the perforation and lamination, thereby the plies are arranged such that the direction of the bosses cross each other.

53. The process according to claim 52, wherein the segmental stretching is carried out with grooved rollers on which there are intervals of missing cogs, to obtain a stretching result in which there occurs a regular pattern of parallel linear regions, which are without receding portions and have a width at least 10 times the average width of the receding portions.

54. The process according to claim 52, wherein the perforations in the two plies A and B are formed in a regular pattern, and the directions of the criss crossing arrays of receding portions are coordinated with this pattern in such way that essentially no single receding portion in the ply B leads from any perforation in the ply A to any perforation in the ply B.

55. The process according to claim 54, where a fluid under pressure, preferably air, is passed through the laminate from the ply A side to the ply B side to bend the receding portions in both plies in the direction of this flow, whereby preferably the fluid has an elevated temperature suitable for stabilization of the bent shape of the receding portions.

56. The process according to claim 42, wherein the lamination layer is on both the plies A and B, each lamination layer being only present in a pattern consisting of a linear array of stripes, the stripes on the ply A crossing the stripes on the ply B to form bonding only at the spots where the two arrays intersect.

57. The process according to claim 30, wherein the ply A is supplied with flutes which extend linearly in the longitudinal or transverse direction, and the bases of the flutes is bonded to a generally flat ply B, whereby the flutes define channels which extend substantially in a longitudinal or a transverse direction of the laminate, a wavelength of the flutes being about 3 mm or less and a height of the flutes being about 0.3 mm or more, whereby the barrier parts of the channel formed connections are at the bases of the flutes where the ply A is bonded to the ply B the gap of this barrier part being formed by segmental stretching of the ply B to form linear receding portions which in the laminate extend under an angle to the direction of the flutes.

58. The laminate according to claim 3, wherein the gap has an average size of no less then 5 μm.

59. The laminate according to claim 3, wherein the gap has an average size of no less then 10 μm.

60. The laminate according to claim 6, wherein the added particulate material is disposed in a coextruded surface layer forming the surface A1 and/or the surface B1.

61. The laminate according to claim 8, wherein the stretching irregularities comprise type occurring in stiff polymers at low stretching ratios and low stretching temperatures.

62. The laminate according to claim 12, wherein the distance is no larger than about 0.5 mm.

63. The laminate according to claim 12, wherein the distance is no larger than about 0.1 to 0.2 mm.

64. The laminate according to claim 15, wherein the division between the receding portions is no larger than about 0.2 mm.

65. The laminate according to claim 19, wherein the ply is oriented in substantially an uniaxial manner substantially parallel with these furrows.

66. The laminate according to claim 25, wherein the size of the holes is about 0.1 to 0.4 mm and the distance between neighboring holes is about 1 to 3 mm.

67. The laminate according to claim 25, the size of the holes is between about 0.2 to 0.3 mm and the distance between neighboring holes is about 0.5 to 5 mm.

68. The laminate according to claim 25, wherein the size of the holes is about 0.2 to 0.3 mm and the distance between neighboring holes is about 1 to 3 mm.

69. The laminate according to claim 28, wherein the bent shape is a stabilized shape.

70. The process according to claim 38, wherein perforation is carried out by using serrations on blades mounted around the circumference of a heated roller.

* * * * *